United States Patent
Fablet

(10) Patent No.: US 8,601,368 B2
(45) Date of Patent: Dec. 3, 2013

(54) PROCESSING METHOD AND DEVICE FOR THE CODING OF A DOCUMENT OF HIERARCHIZED DATA

(75) Inventor: Youenn Fablet, La Dominelais (FR)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/352,997

(22) Filed: Jan. 13, 2009

(65) Prior Publication Data

US 2009/0183067 A1   Jul. 16, 2009

(30) Foreign Application Priority Data

Jan. 14, 2008   (FR) ..................................... 08 50203

(51) Int. Cl.
*G06F 17/00* (2006.01)

(52) U.S. Cl.
USPC ............................ 715/242; 715/239; 715/234

(58) Field of Classification Search
USPC ......................................... 715/242, 234–238
See application file for complete search history.

(56) References Cited

U.S. PATENT DOCUMENTS

| | | | | |
|---|---|---|---|---|
| 5,278,970 A * | 1/1994 | Pence | ............................... | 710/68 |
| 5,635,931 A * | 6/1997 | Franaszek et al. | ............... | 341/51 |
| 5,635,932 A * | 6/1997 | Shinagawa et al. | ............... | 341/51 |
| 6,292,587 B1 * | 9/2001 | Toho | ............................... | 382/238 |
| 6,345,307 B1 * | 2/2002 | Booth | ............................ | 709/247 |
| 6,635,088 B1 * | 10/2003 | Hind et al. | ..................... | 715/236 |
| 6,850,948 B1 * | 2/2005 | Krasinski | ............................... | 1/1 |
| 6,883,137 B1 * | 4/2005 | Girardot et al. | ................ | 715/242 |
| 7,013,425 B2 * | 3/2006 | Kataoka | ......................... | 715/242 |
| 7,016,547 B1 * | 3/2006 | Smirnov | ......................... | 382/245 |
| 7,043,686 B1 * | 5/2006 | Maruyama et al. | ............ | 715/242 |
| 7,307,552 B2 * | 12/2007 | Ma et al. | ........................... | 341/51 |
| RE41,152 E * | 2/2010 | Reynar et al. | .................. | 708/203 |
| 7,676,742 B2 * | 3/2010 | Binding et al. | ................ | 715/242 |
| 2002/0073116 A1 * | 6/2002 | Middleton | ...................... | 707/513 |
| 2002/0107887 A1 * | 8/2002 | Cousins | ......................... | 707/513 |
| 2002/0188633 A1 * | 12/2002 | Davis et al. | .................... | 707/513 |
| 2004/0111676 A1 * | 6/2004 | Jang et al. | ...................... | 715/513 |
| 2004/0143791 A1 * | 7/2004 | Ito et al. | ......................... | 715/513 |
| 2004/0225754 A1 * | 11/2004 | Lee | ................................ | 709/247 |
| 2005/0144556 A1 * | 6/2005 | Petersen et al. | ................ | 715/513 |
| 2006/0117307 A1 * | 6/2006 | Averbuch et al. | .............. | 717/143 |
| 2007/0234199 A1 * | 10/2007 | Astigeyevich | ................. | 715/513 |
| 2007/0300147 A1 * | 12/2007 | Bates et al. | ..................... | 715/513 |
| 2009/0183067 A1 | 7/2009 | Fablet | ............................ | 715/234 |
| 2010/0192056 A1 * | 7/2010 | Bellessort et al. | ............. | 715/237 |

OTHER PUBLICATIONS

Peintner et al., Efficient XML Interchange (EXI) Primer, Dec. 19, 2007, W3C.*

(Continued)

*Primary Examiner* — Cesar Paula
*Assistant Examiner* — Howard Cortes
(74) *Attorney, Agent, or Firm* — Fitzpatrick, Cella, Harper & Scinto

(57) ABSTRACT

A method of processing a document having hierarchized data organized into items includes a prior step of generating at least one coding table and a step of coding the document. The coding table, which includes coding information organized into coding structures, each associated with an item, is generated based on the prior coding of other documents of hierarchized data. Coding the document includes extracting an item to code, determining within the coding table a coding structure associated with the item, and coding the extracted item on the basis of the determined coding structure.

7 Claims, 11 Drawing Sheets

(56) References Cited

OTHER PUBLICATIONS

XMLSpy, User Manual and Programmer's Reference, Dec. 2006, Altova.*

Ng., A., "Optimising Web Services Performance with Table Driven XML", IEEE, Proceedings of the 2006 Australian Software Engineering Conference, Sydney, Australia, 2006.

Kalman, M., et al., "Compacting XML Documents", Information and Software Technology, Amsterdam, The Netherlands, vol. 48, No. 2, pp. 90-106, Feb. 1, 2006.

Toman, V., "Syntactical Compression of XML Data", Advanced Information Systems Engineering, International Conference, Jun. 1, 2004.

Peintner, D., Editors, "Efficient XML Interchange (EXI) Primer—W3C Working Draft", Dec. 19, 2007.

* cited by examiner

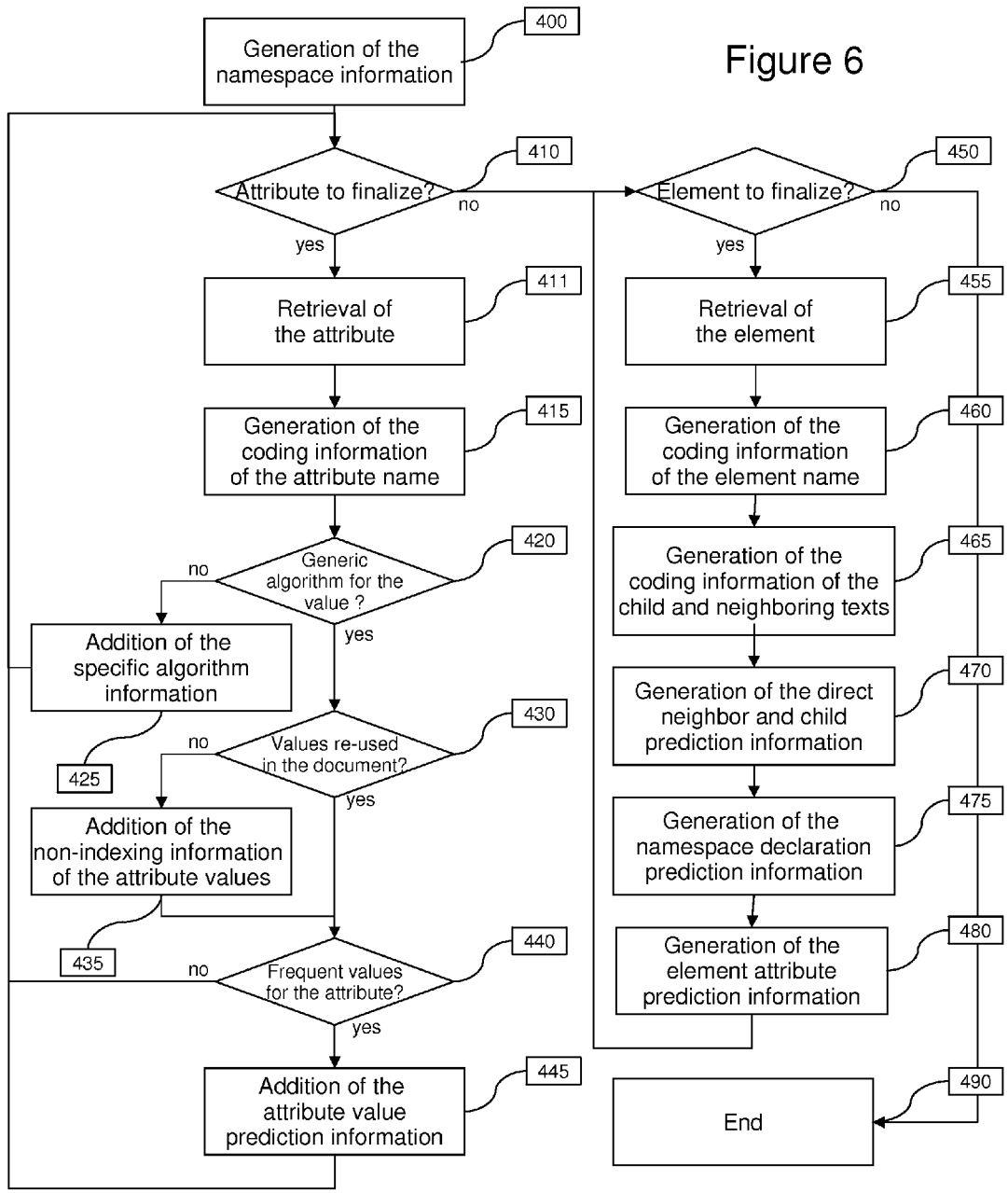

PROCESSING METHOD AND DEVICE FOR THE CODING OF A DOCUMENT OF HIERARCHIZED DATA

BACKGROUND

1. Field

The present invention concerns a processing method and device for document coding. It applies, in particular, to the XML language (XML being the acronym for "Extensible Markup Language"). This language is a syntax for defining computer languages. Thus XML makes it possible to create languages that are adapted for different uses but which may be processed by the same tools.

2. Description of Related Art

An XML document is composed of elements, each element starting with an opening tag comprising the name of the element (for example: <tag>) and ending with a closing tag which also comprises the name of the element (for example </tag>). Each element may contain other elements, termed "child elements" (a filiation terminology, "parent", "child", being used to describe the relationships between the nested elements) or text data.

Furthermore, an element may be specified by attributes, each attribute being defined by a name and having a value. The attributes are placed in the opening tag of the element they specify (for example <tag attribute="value">).

XML syntax also makes it possible to define comments (for example <!--Comment-->) and processing instructions, which may specify to a computer application the processing operations to apply to the XML document (for example "<?myprocessing?>"), as well as escape sections which make it possible to avoid a section of text being interpreted as a tag when it has the form thereof (for example "<![CDATA[<text>Escape</text>]]>" in which <text> is recognized as a string and not as a tag).

In XML terminology, the set of the terms "element", "attribute", "text data", "comment", "processing instruction" and "escape section" are grouped together under the generic name of "item". In a more general context, all these terms (forming the element defined between an opening tag and a closing tag) may be grouped together under the generic name of "node".

Several different languages based on XML may contain elements of the same name. To be able to mix several different languages, an addition has been made to XML syntax making it possible to define "Namespaces". Two elements are identical only if they have the same name and are situated in the same namespace. A namespace is defined by a URI (acronym for "Uniform Resource Identifier"), for example "http://canon.crf.fr/xml/mylanguage". The use of a namespace in an XML document is via the definition of a prefix which is a shortcut to the URI of that namespace. This prefix is defined using a specific attribute (for example "xmlns:ml="http://canon.crf.fr/xml/mylanguage" associates the prefix "ml" with the URI "http://canon.crf.fr/xml/mylanguage"). Next, the namespace of an element or of an attribute is specified by preceding its name with the prefix associated with the namespace followed by ":" (for example "<ml:tag ml:attribute="value">" indicates that the element tag arises from the namespace ml and that the same applies for the attribute attribute).

The XML Schema standard defines a language making it possible to describe the structure of a set of XML documents. An XML Schema document is an XML document, and describes all the elements and attributes that may be present in an XML document in accordance with that XML Schema document, as well as the relationships between those elements and those attributes.

Other systems enable the structure of a set of XML documents to be described, such as DTDs (acronym for "Document Type Definition") or such as the Relax NG language.

XML has numerous advantages and has become a language of reference for storing data in a file or for exchanging data. XML makes it possible in particular to have numerous tools for processing the files generated. Furthermore, an XML document may be manually edited with a simple text editor. Moreover, as an XML document contains its structure integrated with the data, such a document is very readable even without knowing the specification.

The main drawback of the XML syntax is to be very prolix. Thus the size of an XML document may be several times greater than the inherent size of the data. This large size of the XML documents thus leads to a long processing time when XML documents are generated and read. It also leads to a long transmission time.

To mitigate these drawbacks, other methods for coding an XML document have been sought. The object of these methods is to code the content of the XML document in a more efficient form, while enabling the XML document to be easily reconstructed. However, most of these methods do not maintain all the advantages of the XML format.

Among these methods, the simplest consists of coding the structural data in a binary format instead of using a text format. Furthermore, the redundancy of the structural information in the XML format may be eliminated or at least reduced (for example, it is not necessarily useful to specify the name of the element in the opening tag and the closing tag).

Another method is to use an index table, in particular for the names of elements and attributes which are generally repeated in an XML document. Thus, at the first occurrence of an element name, it is coded normally in the file and an index is associated with it. Next, for the following occurrences of this element name, the index is used instead of the complete string, reducing the size of the document generated, but also facilitating the reading (there is no longer need to read the complete string in the file, and furthermore, the determination of the read element may be carried out by a comparison of integers instead of a comparison of strings of characters).

Lastly, beyond these elementary methods, there are more highly developed methods consisting in particular of taking into account a higher number of pieces of structural information of the document in order to further compress the data.

Among others, the case of "Efficient XML" may be cited, which is a format used as a basis for the standardization of a binary XML format by the EXI working group of W3C (EXI being an acronym for "Efficient XML Interchange" and W3C being an acronym for "World Wide Web Consortium" which is an organization producing standards for the Web) which takes into account the order of appearance of the different items within a document to construct a grammar which makes it possible to code the most frequent items using a small number of bits.

The binary XML format "Fast Infoset" may also be mentioned, which is specified by the standard ITU-T Rec X.891|ISO/IEC 24824-1, which provides a more compact representation of an XML document by using binary codes of items and index tables. In this format, the types of items are described as lists which use binary codes of variable length. Fast Infoset intensively uses indexing techniques by creating tables for specific sets of XML information. These tables make it possible to code a given piece of information (an item for example) in a literal manner (for example according to one of the character coding formats UTF8 or UTF16, where UTF is an acronym for "UCS transformation format"8 bits) the first time that piece of information is encountered during the coding of the document. This piece of information is then added to the indexing table and associated with an index.

Later, when that piece of information is detected again in the XML document, the corresponding index is retrieved from the indexing table and the value of that index is then coded instead of the piece of information. A notable compression of the data may thus be obtained.

A certain number of indexing tables may be noted, among which are:
- two tables respectively indexing the prefixes and the URIs in order to define the namespaces;
- two specific tables respectively indexing the attribute values and the text node values;
- a table indexing the local names of attributes and elements;
- two specific tables respectively indexing the qualified names (which group together for example a prefix, a URI and a local name) of elements, and the qualified names of attributes.

It may be noted that the Fast Infoset standard enables the coder to decide whether a particular attribute value or text node value is to be indexed, for example depending on the length of the value or of the string This makes it possible in particular to limit the size of the memory used by the coder. The decision whether or not to index an attribute value or a text node is then coded in the Fast Infoset stream to enable the associated decoder to index or not index the values to decode.

Returning to "Efficient XML", it is noted that this standard uses a set of grammars to code an XML document.

To be able to code the items comprised in an XML document, the Efficient XML specification divides each of the "nodes" into elementary parts called events, for example an opening tag. These events are similar to those generated by XML parsers working in streaming mode, that is to say representing an XML document as a data stream, such as the SAX parsers (SAX being the acronym for "Simple API for XML"). Thus, for example, in the Efficient XML specification, an XML node is represented by a start element event (opening tag), a set of events representing its content and an end element event.

When an event is composed of a single item, it is noted that an assimilation of the event to the item must be made. Thus, for the following portion of the description, event and item will be assimilated.

A grammar is composed of a set of productions, each production comprising an XML event (or item) description, an associated coding value and the statement of the following grammar to use. To code an XML event using a grammar, the production containing the most precise description of the XML event is used. The coding value contained in that production is used to represent the event, and the information contained in the event and not described in the production is coded.

Grammars and productions are thus viewed as coding structures of the events or items that they propose to code.

A grammar according to Efficient is upgradeable. In a certain number of cases, after the occurrence of an XML event already described by a production of the grammar (if it is not described by a production, it cannot be coded by the grammar), the grammar is modified to include a new more efficient production corresponding to that XML event. This production may either contain a more precise description of the event, reducing the number of pieces of information to code to represent the event, or have a more compact coding value.

The coding values, or "codes", are expressed in the form of "priorities" having, generally, between 1 and 3 levels. Coding a coding value amounts to coding the values of its priority. Each level is coded over the minimum number of bits to be able to code the highest value of that level associated with a production of the grammar. For example, for a level taking values from 0 to 6, 3 coding bits are used.

To code an XML document, a set of grammars is used. A few grammars serve for coding the actual structure of the XML document. Furthermore, for each type of XML element present in the document (a type of XML element being a set of elements having the same name), a set of grammars is used to code the XML elements of that type.

The rules of grammars used may either be generic rules, common to all the XML documents and constructed on the basis of the XML syntax, or be rules specific to a type of document, constructed on the basis of an XML Schema describing the structure of that type of document.

On decoding, the inverse process is used: the coding value is extracted and makes it possible to identify the coded XML event, as well as the complementary information to decode.

Furthermore, on decoding, the same grammar evolution rules are used, making it possible at any time to have a set of grammar rules identical to that which was used on coding.

By way of example, the following XML fragment is used to describe the coding of an XML document using the Efficient XML specification:

```
<person>
    <firstname>John</firstname>
    <lastname>Smith</lastname>
</person>
```

As the coder has not yet encountered the "person" element or event, a grammar "by default" is created for that element. This is a grammar only containing generic productions. During the coding of the "person" element, new productions are created and inserted to render the grammar linked to the "person" element more effective. The grammar by default that is used to code the content of the "person" element is the following (in simplified manner relative to the Efficient XML specification):

ElementContent:

| | |
|---|---|
| EE | 0 |
| SE (*) ElementContent | 1.0 |
| CH ElementContent | 1.1 |

"EE" corresponds to the end element event, "SE (*)" corresponds to some particular start element event (generic, the name is thus not specified), and "CH" corresponds to a text content event.

The grammar thus created is stored in a table, for example in volatile memory of the coder.

On coding, after having received the event corresponding to the start "person" element, "SE (person)" and having coded it, for example literally, the coder selects the coding grammar for the content of the "person" element, described above.

Next, the coder receives the event corresponding to the start "firstname" element, "SE (firstname)". The production which corresponds to that event in the above grammar is the second:

| | |
|---|---|
| SE (*) ElementContent | 1.0 |

The coder will thus code the priority "1.0". As the first level of priority comprises two separate values ("0" and "1") from among the productions of the grammar, that level may be coded over one bit, with the value "1". Similarly, the second level of priority comprises two separate values and may be coded over one bit, with the value "0". The priority "1.0" is thus coded here with the two bits "10".

Next, as the production does not specify the name of the element, "firstname" is coded, for example laterally, using the production.

| | |
|---|---|
| CH ElementContent | 1.1 |

The coding of the content of "firstname" is then continued. To that end, the rule associated with that element is searched for. As no "firstname" element has been encountered, a "firstname" grammar is created from the grammar by default. The "firstname" element contains a text node as its sole child. Once this text node has been coded, the grammar of "firstname" is updated by inserting a production text CH.

"firstname" grammar
ElementContent:

| | |
|---|---|
| Characters | 0 |
| EE | 1 |
| SE (*) ElementContent | 2.0 |
| CH ElementContent | 2.1 |

Once the content of "firstname" has been coded, the coder modifies the grammar associated with the "person" element to adapt the grammar to the XML data encountered. For this, a new production is added to the grammar, this production corresponding to the start "firstname" element. The priority "0" is associated with this production, and the other priorities are offset to maintain the uniqueness of the priorities. It is noted here that as the decoder acts symmetrically, it will be capable of performing similar offsets of priorities (or indices) progressively with the advancement of the decoding of the data received. The grammar thus becomes:

"person" grammar
ElementContent:

| | |
|---|---|
| SE (firstname) ElementContent | 0 |
| EE | 1 |
| SE (*) ElementContent | 2.0 |
| CH ElementContent | 2.1 |

The following event of the XML fragment to code is the start of the "lastname" element. As for "firstname", this element is coded using the production:

| | |
|---|---|
| SE (*) ElementContent | 2.0 | since no production corresponding to the "lastname" element has been found.

As the first level of priority now has three possible values, it is coded over 2 bits, with the value "2". The second level of priority is still coded over a single bit. The priority "2.0" is thus coded here with the three bits "100".

The name of the element, "lastname", is then coded for example literally in binary. Next the content of "lastname" is coded with the aid of the grammar associated with the "lastname" element, to be created if necessary at the time of the first iteration, in similar manner to that described above for "firstname"

Next, the "person" grammar is modified to add thereto a production corresponding to the start of the "lastname" element and it thus becomes:

"person" grammar
ElementContent:

| | |
|---|---|
| SE (lastname) ElementContent | 0 |
| SE (firstname) ElementContent | 1 |
| EE | 2 |
| SE (*) ElementContent | 3.0 |
| CH ElementContent | 3.1 |

The end element event, corresponding to the end of the "person" element, is then coded, using the production:

| | |
|---|---|
| EE | 2 |

It is to be noted that all the productions of the grammar; with the exception of this last production, comprise the description of an event, the associated code and the following grammar to use. This following grammar is that used to continue the coding after the coding of the event included in the production.

However, in the case of an event describing a start element, the grammars specific to that element are used to code the content of the element. The following grammar indicated in the production comprising the start element event is used for the coding after the end of that element.

Thus, the production comprising the end element event does not contain any following grammar: the grammar to use to code the following portion of the document is that which had been indicated by the grammar of the parent element in the production used to code the start event of that element.

If, further on in the XML document, the coder encounters another similar "person" element, that element will be coded on the basis of that grammar. Thus the first event corresponding to the content of the "person" element is the start event of the "firstname" element. This element is coded with the production:

| | |
|---|---|
| SE (firstname) ElementContent | 1 |

It is noted that the production

| | |
|---|---|
| SE (*) ElementContent | 3.0 | also corresponds to that event, but is less precise (it does not specify the "firstname" name of the element). It is thus the first production which is used for an increased coding efficiency.

The coder thus codes the priority of this production, that is to say the value "1", which is coded over two bits (as it takes the values from 0 to 3), i.e. "01". There is no need to code the name of the element, since it is specified by the production and arises from the initial literal coding when the "firstname" element was encountered for the first time.

The coder next codes the content of the "firstname" element.

As a production specific to the start event of the "firstname" element already exists in the grammar, it is not necessary to add a new production to the grammar.

The coder next codes the start event of the "lastname" element similarly, by solely coding the priority "0" with the two bits "00".

Thus, for the coding of the second "person" element similar to the first, the code generated is more compact, since it is no longer necessary to code the name of the elements contained in "person", either literally (by coding the entirety of the string), or even using an index.

A point that is common to the Fast Infoset and Efficient XML methods is the use of coding tables, respectively indexing tables and grammar/production tables, which can be upgraded and kept up to date by the coder to describe each of the elements of the data to code. In the remainder of the present document, these tables will be referred to by the term coding tables without distinguishing between them. The coding tables are constituted by coding structures associating at least one coding value with an element.

Whether it be for one or the other of these two coding methods, the coding of an XML document requires several processing operations that are costly in time and machine resources, such as:
- the literal coding of XML strings, for example prefixes, local names or values, in UTF8 or UTF16 format;
- searching, in the coding tables, for the indexes corresponding to a processed piece of XML information (or item or event)
- constructing and updating the coding tables, for example based on a single grammar by default.

It is also noted that these processing costs multiply when the number of documents to code is multiplied.

BRIEF SUMMARY

It is thus sought to reduce the processing costs linked in particular to these different considerations, on coding documents, in order to provide faster coding.

To that end, the invention concerns in particular a method of processing a document comprising hierarchized data organized into a plurality of items, said method comprising:
- a prior step of generating at least one so-called "coding" table comprising coding information organized into a plurality of coding structures each associated with an item, said generating prior step being based on the prior coding of other documents of hierarchized data,
- a step of coding said document of hierarchized data, comprising:
  a. a step of extracting an item to code;
  b. a step of determining, within said coding table, a coding structure associated with said item to code;
  c. a step of coding said extracted item on the basis of said determined coding structure.

The relation between the coding structure referred to here and the grammars/productions referred to previously can easily be seen. Thus, the coding structure provides coding information in a general way, for example the composition of an item, values which it may take and possibly associated pre-coded values, as will be seen below.

It is also noted that by the use of a pre-filled coding table, the coding of new hierarchized data does not necessarily take the grammar by default referred to above as its starting point. The use of the result of documents already coded provides in particular consistent coding tables giving a priori information to the coder.

The extracting step is understood, within the meaning of the present invention, as a step consisting of retrieving a new item from a data file or a stream of data, for example data retrieved on the fly in a client-server application.

The term "document" used above aims to encompass not only any data file but also any data produced in the form of a stream by an application, provided that the document composed of those data has a start and an end, for example a document start tag and a corresponding document end tag (by way of illustration, the tags <html> and </html> delimit an HTML document, and the prolog <?xml version= . . . > initiates an XML document). It is noted that these documents are of electronic type.

In practice, this extraction is carried out in the progressive order of enumeration of the data within the data file or stream, for example with the aid of a parser.

The invention comes from the finding that an XML application may code a high number of XML documents. There is generally high redundancy between these documents. Thus, whereas an XML application generally knows a limited number of languages based on XML, a large part of the processing operations performed by a coding application for a document is performed, by that same application, for the coding of another document. More particularly, in practice, between two documents to code, the coder erases the "learning", that is to say for example the coding tables, linked to the first document coded before coding the following document possibly by "relearning" the same structures or the same elements.

The invention thus provides a solution making it possible to reduce, in part, the processing operations carried out for each coding. This reduction is based in particular on the knowledge by the coder of a probable description of the XML document to code illustrated by the pre-filled coding table. The step of coding the item thus uses information (coding structure) of the pre-generated coding table, that is to say the a priori knowledge of coding information arising from a probable description. A search is thus obtained, for the coding value corresponding to the item to code, that is guided, simplified and generally faster.

The use of such pre-defined coding structures makes it possible not to reconstruct, at each operation of coding new data, in particular those coming from the same application, dedicated coding structures by starting with a structure by default.

By virtue of the invention, it is possible, for example, to re-use coding tables which have been produced at the time of previous coding operations, or else configure the coder, and more specifically the coding tables, using imported data. Once that importation has been carried out, the coder uses those data for the coding of one or more XML documents.

In one embodiment, the steps a, b, and c are re-iterated for a plurality (and in particular a set) of items from the document of hierarchized data, in particular for example from the data file. The complete coding of the file may thus be carried out.

In order for obtain a faster indexing search in the coding tables, it is provided for the determining step to comprise a step b') of predicting said item to code. For example, said prediction may indicate a structure of said coding table in order to perform the step b) of coding the item on the basis of that structure. The indication may, for example, take the form of a predicted index corresponding to the index of the structure in the coding table. It is thus noted that the prediction b') takes place prior to the coding step c).

In order to determine the correctness of the prediction, there is provided, during the determining step b), a step b") of comparing between said extracted item and said predicted item.

The comparison may in particular be carried out on the item events in their entirety or on the items composing those events, in particular when the event is an element start.

According to a particular feature, the prediction b') is on the basis of the item coded during the preceding iteration, that is to say, in practice, on the basis of the preceding item, in the enumeration of the document of hierarchized data. The prediction is thus based on a current context composed, at least in part, of the item which has just been coded. When it is desired to predict an element, it is indeed more efficient to respect a logical order of going through the data, here the order of the data file, and to rely on a provided order of those data (an a priori description structure as introduced below).

In particular, the prediction b') is carried out using a set of description structures (26) of items linked together so as to form an a priori global description (that may be likened to a list of items that is possibly ordered), said prediction consisting of determining an item of which the associated description structure is linked to the description structure of the item coded during the preceding iteration, that is to say an item which follows the previously coded item.

In particular, said description structures and the coding structures are linked, for example using a pointer from one structure to the other, such that a given item is represented by a description structure and a coding structure. Thus, from a predicted description structure it is easy to retrieve the coding information present in the corresponding coding structure.

In one embodiment, to form the link between a coding structure and a description structure, the latter comprises the indication of an index for the corresponding item (for example the index that it is desired to code), the index referring the coding structure of the coding tables and more specifically a production of at least one grammar. This index-production reference is in particular operational in both directions and makes it possible to accelerate the determination of the coding value of the extracted item in case of positive determination, since with the use of this index, determined in the description structure, the coding information is directly obtained in the coding tables. The index may in particular be pre-coded in order to still further accelerate the coding process. It is noted here that these indices may be determined and inserted in the description structures at the time of the formation of the above coding tables on the basis of the description file.

In particular, said description structures are generated at the preceding step, that is to say prior to starting the actual coding of the document.

In one embodiment of the invention, said description structures form a chain of structures of main attributes, that is to say a list of main attributes in the form of (description) objects linked to each other.

In particular, said list of main attributes may be ordered. Being ordered makes it possible to facilitate the prediction of the following item on the basis of the last extracted and coded item.

Also, at least one structure of main attributes may comprise a pointer to a following attribute structure. Several pointers may be provided, which may possibly be ordered. This configuration make it possible to provide efficient prediction means for all the attributes that are capable of being implemented in the document of data.

In one embodiment of the invention, said description structures form a chain of structures of main elements. In particular, said structures of main elements are ordered in said chain in order to simplify the prediction procedure. In practice, the chain may be ordered by choosing at least one main element designated "root", on the basis of which the coding or the prediction of new hierarchized data may begin.

In particular, at least one structure of main elements comprises a pointer to a hierarchically lower element structure, designated child element. Several pointers may possibly be provided, for example pointers forming an ordered list. This also contributes to an efficient prediction of the following item of the data file. In practice, the list generally provides information for a single child element in order to limit the procedures of searching in and going through the description structures.

Also, at least one structure of main elements comprises a pointer to an element structure at the same hierarchical level, designated following element. Several pointers may possibly be provided, for example pointers forming an ordered list. This list also contributes to efficiently predicting the following items. In practice, the list generally provides information for a single following element in order to limit the procedures of searching in and going through the description file.

Also, at least one structure of main elements comprises a pointer to an attribute structure. Several pointers may possibly be provided, for example pointers forming an ordered list. The attributes are in particular described according to the lists of attributes presented above.

Also, at least one structure of main elements comprises a pointer to a structure of namespace declarations. Several pointers may possibly be provided, for example pointers forming an ordered list.

It is understood here that to obtain a great hierarchical depth enabled by the XML description, the child elements attached to a main element are also main elements with which child elements, attributes and following elements are associated.

In one embodiment said predicting step is carried out on at least one item from among the set comprising an opening tag, an opening tag attribute, a namespace declaration, a piece of information on attribute values and/or text nodes.

In one embodiment, at the time of said prior generation, said coding table is initialized using a description file, both for the coding structures and for the description structures.

Thus, the description and coding structures adopt the a priori structural description of the hierarchized data supplied by the description file. In practice, the description and coding structures comprise at least one grammar comprising productions that are arranged to describe an item by a set of events.

In particular, the configuration file may notably be associated with the application that generated the document of hierarchized data to code. Thus, the coder will use the a priori information which may correspond to the organization of the document of data to code which will have been generated by said application.

According to a particular feature, the document of hierarchized data and the other documents of hierarchized data were generated by the same application. Since all these data documents were generated by the same application, they follow the same format describing the documents more precisely than XML schemas, as indicated later in the description.

The structures of description and coding which come from the first data documents may thus supply an a priori description and coding information that are consistent with the organization of all the data documents to code. Efficient coding and a reduction in the associated processing costs are thus obtained.

It may also be provided for said prior generation to comprise a literal (binary) pre-coding of at least one value associated with at least one item and the storage of said pre-coded value in the coding structure associated with said item. By way of example, such a value may be indices, strings, digital values.

A single preliminary coding operation of the indices is thus performed at the time of the pre-coding and never during the coding, which makes it possible to reduce the operations to perform at the time of the coding of the items of the data file. The coding phase c) then consists, in part, of retrieving these pre-coded values from the coding structures. The invention thus provides a faster coding method.

As a variant of the pre-coding, it is provided for each coding step c) to comprise a sub-step of binary coding of a value associated with said extracted and predicted item, and which is provided in the description structures. Thus, once the value has been retrieved that is associated with the extracted and actually predicted item, the coding of that value, for example an index, is carried out.

In one embodiment, a step may also be provided of updating the at least one coding table in case of wrong prediction, said updating being according to a generic coding of said extracted item. "Generic coding" is understood to mean a coding operation of the state of the art, for example the Efficient XML coding, as is already known. By virtue of thus embodiment, the coding and description structures are enriched progressively with the advancement of the coding in order to make the remaining coding of the data document, and even the coding of following data documents, benefit therefrom. By virtue of this embodiment, it is also possible to have in parallel the constitution of the description and coding structures with the actual coding of the items composing a first data document or a later data document.

In particular, in case of wrong prediction, a step is provided of generic searching for said item extracted from said coding tables. This search corresponds to what is carried out by the state of the art and said extracted item is then coded according to the result of the search. The result of the search may in particular be an index that is already coded. Guaranteed coding is thus obtained without increase in cost compared with the known mechanisms of the prior art.

In one embodiment, at least one coding table comprises, in the coding structures each associated with an item, an indicator arranged to indicate whether said item has already been coded at a coding step c) of the coding of said data document.

In particular, the indicators each comprise an counter which is incremented at each new literal coding b) of said item.

Also, it is provided for said indicators to be reinitialized on the coding of a new document of hierarchized data.

In particular, this reinitialization comprises the incrementation of a counter of the number of coding operations associated with the item for the hierarchized data to code, so as to set it to the same level as a second counter of the number of coding operations associated with the item independently of the hierarchized data to code.

As a variant, this reinitialization comprises the reinitialization of each indicator to a so-called null value indicating that no item has been coded.

In practice, these two variants may be implemented as follows:

each value of the coding table has an "already-coded" field which passes from 'false' to 'true' at the time of the first coding of the item for the data to code. At the end of the coding of these data, it is provided to reset all these fields to 'false' in order to be able to properly perform a second coding operation;

each value in the file has a field Cv officiating as counter of the number of coding operations (incremented at each occurrence). Each table has a field Ct officiating as counter of the number of coding operations for a specific value. Thus, when a value is encountered in the extracted items, if Cv<Ct, literal coding is carried out of the value using a pre-coded value already present in the tables (since that value has already been coded during a preceding coding operation of the file). The index of the value is updated and Cv is set equal to Ct. If Cv>=Ct, the value has already been literally coded for the coding of the current file and the index of the value is coded. This variant also enables the integration of values known by the coder and by the decoder and thus the coding in index form and never in literal form.

The invention thus makes it possible to generate coded files similar to those coded by the known techniques of the prior art such that the decoding of these files may be performed by the same decoders without additional cost.

The invention also relates to a device for processing a document comprising hierarchized data organized into a plurality of items, said device comprising:

a means for generating, prior to a coding operation of said document, at least one so-called "coding" table comprising coding information organized into a plurality of coding structures each associated with an item, said generating being based on the prior coding of other documents of hierarchized data, a means for coding said document of hierarchized data, comprising:

a. an extracting means adapted to extract an item to code from said document;

b. a means for determining, within said coding table, a coding structure associated with said item to code;

c. a means for coding adapted to code said extracted item on the basis of said determined coding structure.

The advantages of this device are similar to those of the processing method of the present invention, as succinctly set forth above.

Optionally, the device may comprise means relating to the features of the processing method set forth above.

In particular, it is provided that the determining means comprises a means for predicting the item to code, for example in the form of an indication (a pointer) of a coding structure of said coding table in order to provide that indication to the coding means c).

Furthermore, the determining means may comprise a comparing means adapted to compare said extracted item with said predicted item and to transmit, to said coding means, an indication depending on said comparison.

According to one embodiment, the coding device comprises a means for current state storage arranged to store information relative to the items extracted by said extracting means, said predicting means being arranged to predict said item to code on the basis of said information stored in the current state storage means, in particular on the basis of the item extracted during the preceding coding operation.

Possibly, said coding means is adapted to code said item to code, in case of wrong prediction, on the basis of said coding tables.

An information storage means, possibly totally or partially removable, that is readable by a computer system, comprises instructions for a computer program adapted to implement the processing method in accordance with the invention when that program is loaded and executed by the computer system.

A computer program readable by a microprocessor, comprises portions of software code adapted to implement the processing method in accordance with the invention, when it is loaded and executed by the microprocessor.

The means for computer program and information storage have characteristics and advantages that are analogous to the methods they implement.

BRIEF DESCRIPTION OF THE DRAWINGS

Still other particularities and advantages of the invention will appear in the following description, illustrated by the accompanying drawings, in which:

FIG. 6 represents, in logigram form, steps of finalizing the description during the construction of the file and/or of the corresponding structures of FIG. 3;

DETAILED DESCRIPTION

Figure 1:
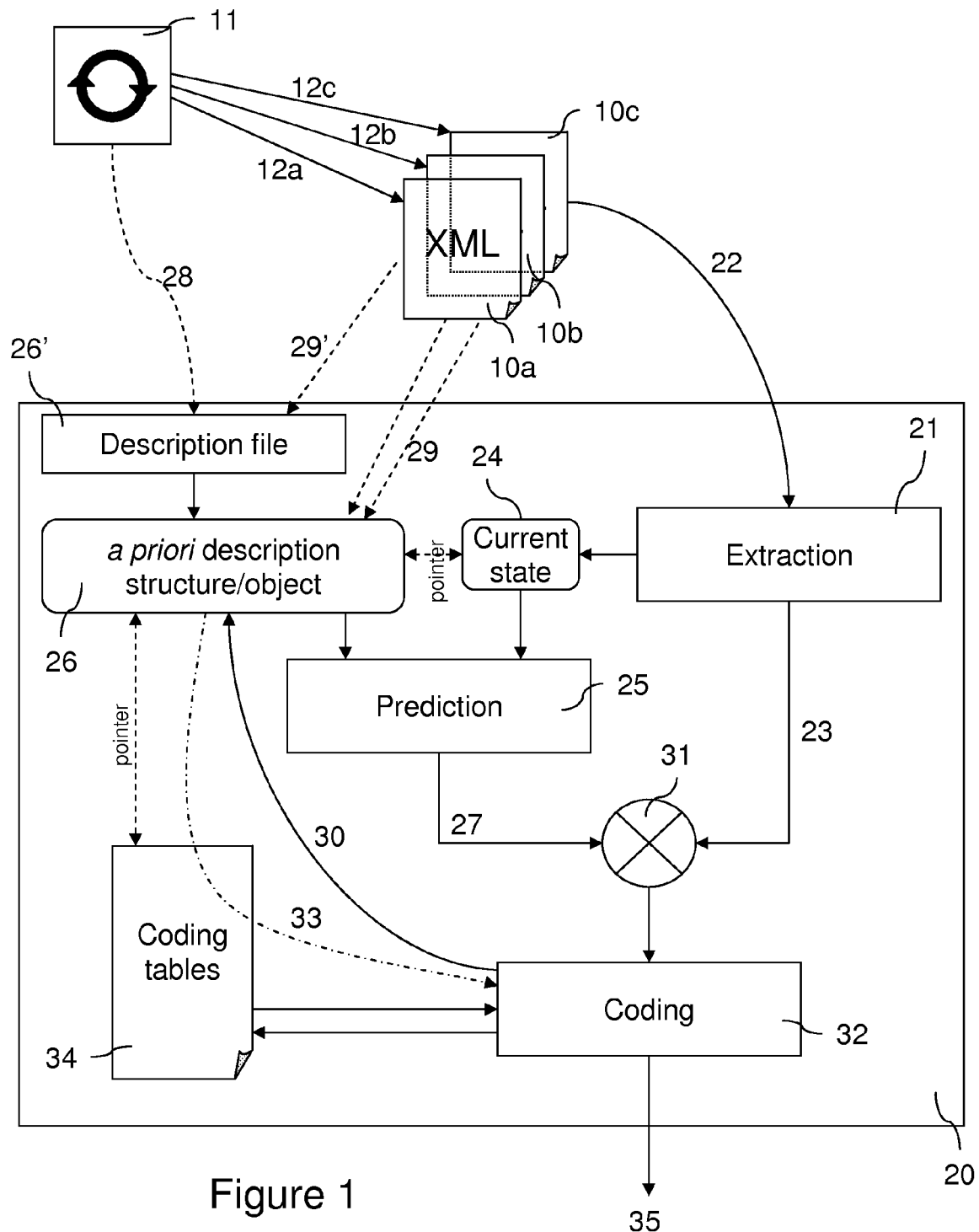
FIG. 1 is a synoptic diagram of the present invention.

With reference to FIG. 1, a description will first of all be given of the general operation of the invention for the coding of XML documents $10a$, $10b$ and $10c$.

These documents are generated by the same XML application 11 and thus have similarities due to the repetitive generation mechanisms of the application 11. This generation is illustrated by the arrows $12a$, $12b$ and $12c$.

In the example of FIG. 1, the coding of the XML document $10c$ is concentrated upon whereas the two documents $10a$ and $10b$ have already been coded by the coder 20. Document $10c$ may equally well be viewed as a document that has already been generated or as a document in course of generation by the application (streaming mode). In the latter case, the invention is applied on the fly to the continuously generated data.

The coder 20 comprises a first extraction module 21 adapted to retrieve (arrow 22) the document $10c$ or each of the items (via the events) of that document and to supply an extracted item 23 to code. This extraction module 21 may in particular comprise an XML parser which facilitates the retrieval of the elementary XML data and events (items, for example attributes, elements, texts).

The extraction module 21 updates a current state piece of information 24, for example by indicating the newly extracted item which will be the subject of the following coding. The current state piece of information 24 also comprises, for example in the form of a list of two items or more, an indication of the item which has just been coded at the preceding coding iteration. This indication of the previous item will in particular serve for the prediction of the item 23 to code. The indication may in particular be a pointer to a description structure as introduced below.

The coder 20 also comprises a prediction module 25 which, on the basis of the current state 24, in particular of the previously coded item, and of description structures or objects 26 determines a predicted item 27. As will be seen later, these description structures inform an a priori description of the XML documents $10a,b,c$ and may be stored directly in the coding tables. These structures 26 are in particular computer objects making it possible to store an organizational data structure. They are established on the basis of a description/configuration file 26' or on the basis of previous coding operations (of earlier documents $10a,b$). To ensure an a priori global description of the documents, it is noted that the description structures 26 are linked to each other, for example via references or pointers.

The prediction of the next item of XML information to code makes it possible, when the prediction is correct, not to have recourse to a conventional coding strategy, for example by generic indexing search (based on indexing tables for Fast Infoset or on grammars for Efficient XML).

This prediction may in particular be offset to the time of the coding of the previous item. Having knowledge of the current item, the prediction module 25 may then determine the next item to code on the basis of the description structures 26, for example by retrieving the following item in an ordered list. It is thus noted that prediction and extraction may be carried out equally well one before the other or in parallel.

The description file 26' is a file that lists a description of organization and of values of the data within XML files. The description objects 26 thus provide a structure that is adapted to store that information on organization and on values. To obtain an efficient prediction which is based on the description structures 26, these latter (and also the file 26') must match, as well as possible, the documents $10a,b,c$ to code. As a matter of fact, if the structures 26 provide the exact organization of the data in the documents $10a,b,c$, then the predicted items 27 will be exactly those expected by the extraction 21.

It is thus noted that the description structures 26 and the possible file 26' only differ by the form in which the description information is stored (computer objects vs. XML files, for example). Thus for the following portion of the document, the characteristics (constitution, formation, for example) of one of those descriptions 26, 26' applies equally well to the other (when the description file 26' exists).

In relation to FIGS. 3 to 6, different mechanisms are provided making it possible to obtain a description file 26' that is efficient with respect to the XML documents 10 to code.

The description file 26' may come from a predefined configuration file, and in particular this configuration file may be associated with the XML application 11 that generates the documents 10 and be generated at the time of the development of the application. This association is illustrated in FIG. 1 by the arrow 28. In this case, it is expected that a description file 26' will be obtained, and thus description structures 26, listing the usual generation mechanisms of the application 11 (for example the order of the XML tags and elements followed by the application 11 for the generation of the XML files). Better forecasting (by the module 25 and on the basis of the description structures 26) of the documents 10a,b,c generated by that application 11 thus results therefrom.

Alternatively or in combination, the description file 26' may be created or completed by the prior coding of the XML documents 10a and 10b (illustration by the arrows 29').

Moreover, the description structures 26 may be created/completed by the prior coding of the documents 10a,b as illustrated by the arrows 29.

The system thus achieves self-learning of the "model" description of the XML documents 10 to code. This learning is made all the more efficient by the XML documents 10 following similar rules of creation, for example when they were generated by the same application 11. This self-learning may be performed continuously (the description file 26' and/or the description structures 26 are updated at each iteration of the coding of documents 10a and 10b) or after the coding has finished for each of the documents 10a and 10b.

The present invention is however not limited to the coding of documents generated by the same single application. The description file 26, the description structures 26' and the different documents 10 to code may be produced on the basis of different applications.

Combined with the description file 26', this learning enables the description structures 26 to be made to converge more rapidly towards a consistent set of XML documents 10 to code. "Consistent" is understood here to mean the fact that the different XML documents of the set adopt the same rules or mechanisms for creation of XML data and thus have similar or close XML formats.

A third route for enriching or forming the file/the description structures 26'/26 consists of completing these latter on the basis of the coding in course of the current XML document (illustration by the arrow 30). This learning is similar to that mentioned in relation to the arrows 29, but concerns the XML document in course of coding.

It is thus understood that to optimize the coding of several XML documents, that may possibly be consistent with each other, care will be taken to keep the same description structures 26 for the coding of all these documents.

The description of an XML document comprises information that can be derived from an XML schema. The description structures 26 and the description file 26' thus contain:
  a list of attributes and elements, preferably a list associated with the attributes and a list associated with the elements;
  for each element of the list, a list of the first possible children, a list of the following possible elements and a list of the possible attributes. The "children" should be understood in the hierarchical sense of the data of the XML file and generally refer to elements of the list which themselves have their own children. in practice, a single following element and a single child are indicated in the list:
  for each attribute of the list, a list of possible following attributes.

Each element may have a corresponding a priori description structure, such that the description structure of a "parent" element comprises pointers to a first child element and a first following element.

It is noted that, contrary to an XML schema which describes an XML language generally, these description structures 26 are based on the customs and rules of use of that language specific to the application 11 generating the XML documents 10. On account of this, the structures 26 and the description file 26' are more precise than a mere XML schema. The following information may thus be retrieved:
  it is provided for the attributes to form an ordered list. As a matter of fact, the order of the XML attributes has no signification according to the XML standard; schema languages do not therefore define any constraint as to order. An application 11, on the other hand, often generates attributes of an element in the same order, which order is fixed at the moment of implementation of the generation of the XML document 10 by that application 11;
  it is provided for the primitives of type <xs:all>, that is to say declarations of structures of complex data, to be described in the structures 26 in the form of an ordered set of elements, the order being specific to the application 11, whereas the conventional declarations of such primitives are conventionally not ordered in relation to the elements composing them.
  the application 11 generally does not use all the possibilities provided by a possible XML schema. On account of this, the extracted pieces of information are often more restrictive than what may be the associated schema. Thus, it is provided for the primitives <xs:wildcard> and <xs:choice> to be replaced respectively by a sub-set of the possible values and elements of those primitives.

The descriptions 26 and 26' consequently contains pieces of information that are not in an XML schema which the application 11 may use as a basis for generating the documents. Examples of such pieces of information are listed as follows:
  the order of the attributes, as mentioned earlier by way of ordering in the lists;
  the presence of a name declaration;
  the definition of the prefixes associated with the name declarations;
  the strategy for insertion of spaces (in terms of typographical characters) between the XML nodes;
  the fact that an attribute or an element always has the same value or takes a restricted number of values;
  the fact there is an advantage for the values of an attribute or of an element to be indexed, which is for example the case when they are repeated within the same XML document 10.

By virtue of these pieces of information, the items are precisely identified (presence of name declarations for example) and the prediction 25 can only thereby be better.

A presentation of an example of a description file 26' is given below, and implicitly of the description structures 26 which result therefrom.

```
<bp:prediction xmlns:bp="htpp://example.org/bx-prediction">
  <bp:attributes>
    <bp:attribute name="id" indexable="true" value="id1"/>
    <bp:attribute name="ratio" type="float"/>
  </bp:attributes>
  <bp:elements root="QName">
    <bp:element name="soap:Envelope"
       indexable="true"
       isRepeating="false"
       beforeFirstChild=" " fistChild="soap:Header"/>
  </bp:elements>
  <bp:examples>
    <soap:Envelope xmlns:soap="http://.../soap/envelope/"
        bp:root="true"
        bp:spacePrediction="true"
        bp:isRepeating="false"
        bp:hierarchyPrediction="true">
```

```
        <soap:Header>
            <headerAck xmlns="http://example.org/ack"
                bp:isRepeating="true"/>
        </soap:Header>
        <soap:Body>
            <ack xmlns="http://example.org/ack"
                bp:nextSibling="comp"
                bp:type="int"/>
        </soap:Body>
    </soap:Envelope>
    <headerAck2 xmlns="http://example.org/ack"
        bp:nextSibling="headerAck"
        bp:type="int"/>
  </bp:examples>
</bp:prediction>
```

This example shows a way to put the data of the description into XML format, for example in declarative form within the elements bp:attributes and bp:elements, or in the form of annotated examples (bp:examples).

The description structures 26 may adopt this representation of the XML elements.

Returning to the prediction module 25 of FIG. 1, it is possible to limit the prediction to specific items of XML information. In the context of the present example, consideration is limited to the following items, which are the most widespread and for which the saving for coding will be the greatest by implementing the invention:

opening tag;
opening tag attribute;
namespace declaration in an opening tag;
information (type, indexing, etc.) on the attribute and text node values.

The prediction module 25 knows, by virtue of the information 24 (a pointer to the description structures), the item which has just been coded (or in course of being coded if the prediction for the coming item is carried out) searches for that item in the description structures 26 (this search can be expected to have been already made for the coding of the previous item). By virtue of the information contained in the description structure retrieved, for example a pointer to another structure, the next item to come is determined (for example child element or element following the previous item). This next item is the predicted item 27.

The prediction 25 may also be based, by way of complement, on the description file 26' when there is one. This is in particular the case, when for reasons of optimization of the executing system (for example limited memory size, in a microcircuit module), only a portion of the description structures 26 is created from the file 26'. Some structures 26 thus comprise a loop back to the description file 26' instead of a pointer to another description structure 26. Consequently, at the time of a prediction process, accessing the file 26' and creating, on request, a new structure 26, may be induced.

At this step, the prediction module 25 may also extract coding information linked to that predicted item in order to facilitate the later coding of the item in case of exact prediction. Pre-coded data (literal values, indices, for example) will thus have been provided linked to the description structures 26. In practice, the description structures 26 are linked to coding tables 34 which comprise those pre-coded data. This link may be made by means of pointers making a bi-directional link between a description structure 26 for an item and an entry (a coding structure) of coding table 34 of the item in question.

It will thus be noted that description structures 26 and coding tables 34 have been filled, at least partially, before the coding of the document 10c.

As indicated earlier, the coder 20 is pre-configured before the coding of the document 10c, either by the prior coding of the documents 10a,b or on the basis of the file 26'. This pre-configuration mainly concerns the formation of the coding tables 34 and of the description structures 26.

At the time of this prior generation of the tables 34, all the values to code are literally coded and these pre-coded values are stored in the entries of coding tables 34 corresponding to the respective description structures 26, in order to enable their determination at the time of the prediction.

Provision is also made at this stage to allocate indices to each of these pre-coded values (indices used for the coding).

The process illustrated by FIG. 1 continues when the extracted items 23 and predicted items 27 are supplied to a comparator 31 in order to determine whether the prediction is correct.

Taking into account the element, attribute or namespace declaration name of the item considered 27, it is verified that the prediction is correct by comparing the strings associated with the extracted item 23.

As regards the values of attributes and of text nodes, the verification of the prediction may concern the exact value, in which case a comparison of the strings is carried out.

Additionally, the type of coding of the values to compare may be taken into account. The type of coding is generally used to distinguish the algorithm for literal coding of the values, in order to take into account the type differentiation of the data (string, integer, float, etc.).

Moreover, whether or not the value is indexed may be taken into account, even if in practice, this prediction is not verified but is used instead in order not to index the values which, according to the description, are not to be found in the document or for which the coding does not appear to be useful.

When the prediction is correct, coding of the item is carried out by a coding module 32 of the coder 20, on the basis of the coding information obtained from the coding tables 34 via the corresponding description structure 26 (arrow 33), which may take place as of the prediction phase 25. The coding of correctly predicted items will be described below in more detail.

When the prediction is erroneous, the coding is also carried out by the coding module 32. The latter then performs a conventional generic search, in the coding tables 34, to retrieve the information necessary for the coding. Due to this, a wrong prediction for an event does not automatically cause a wrong prediction for the following event. This is because, when the prediction is wrong, the prediction of the following item is based on the information retrieved by the generic search.

In conventional manner, a generic search consists of performing a search directly in the coding tables 34 of the coder 20 without a priori knowledge of the item which has just been coded. It is noted here that these tables rely on a key-value pair, which generally leads to calculating an index one or more times on the basis of the key and then comparing the key searched for with the key given by the index. It thus appears that the generic search is much more costly than the cost associated with the prediction (solely requiring reading in the description structure of the previously coded item).

Thus, by virtue of the invention, all the information useful for the efficient processing of the item to code is retrieved, and in particular a coding index.

If the prediction was correct, the retrieval is very fast by virtue of the information contained in the predicted description structures: use is made of the pointers within the description structures 26' to predict the following item and to retrieve the pre-coded indices or values in the coding tables 34. Otherwise, in the absence of exact prediction, the retrieval has the normal cost of indexing detection for a standard binary XML coder using coding tables 34. Nevertheless, by virtue of the pointer provided in the entries of the coding tables, it is possible to resume the thread of the prediction on the basis of the description structure 26 associated (via the pointer) with the entry in the coding tables 34 determined by the conventional route.

Thus, in the coded documents, the pre-coded values are used only once and the later occurrences of the corresponding literal values are replaced by the associated indices (these indices may be re-evaluated if generic coding operations are used, which offsets the indexing of the values), which are possibly determined by prediction.

By virtue of these provisions, for the successive coding of the documents 10*a,b,c*, the coder 20 does not have to perform the progressive construction of the tables 34 several times, which is costly in processing time.

This advantage is illustrated using the following example. Consider several small XML documents in the format below, the coding of which is desired.

```
<soap:Envelope xmlns:soap="http://.../soap/envelope/">
  <soap:Header>
    <headerAck xmlns="http://example.org/ack"/>
  </soap:Header>
  <soap:Body>
    <ack xmlns="http://example.org/ack"/>
  </soap:Body>
</soap:Envelope>
```

In this example, no redundancy in the element names is found, that is to say that redundancy coding (the use of indices) is not efficient. The coding tables 34 progressively formed with the advancement of the coding of such a document then only serve to determine that there is no redundancy and that the element names must therefore be literally coded. In conventional manner, construction is made identically and those tables for the coding of each of the XML documents are destroyed.

By virtue of the invention, provision is made for forming efficient coding structures 26 and coding tables 34 in a single time prior to the coding of the documents. In the above example, these tables will anyway never have been modified since the sequence of the items is regular and thus efficiently predictable by the prediction module 25.

Due to the prior constitution of the coding tables 34, the indication that enables it to be known whether a piece of information (element name, prefix, etc.) has already been coded or not during the coding of the XML document 10 in course is then no longer given by the presence or not of that piece of information (element name, prefix, etc.) in a coding table 34 as is the case in the solutions of the prior art. In order to overcome this lack, it is provided for this indication to be mentioned with the predicted information or with the information located in the coding tables 34.

In practice, two variants are envisaged as follows:
  each entry of the item of the coding table 34 has an "already-coded" field which passes from 'false' to 'true' at the time of the first coding of the item for the data to code;
  each value of the document 10*c* has a field Cv officiating as counter of the number of coding operations (incremented at each occurrence of that value). Each table 34 has a field Ct officiating as counter of the number of coding operations for a specific value. By comparing Cv and Ct, it is thus known whether a coding operation has already taken place for the current document 10*c*.

The coder so configured may efficiently code a document 10*c* respecting the description 26 supplied by the coder 20.

It is to be noted that at each new coding operation, it is necessary to reinitialize the indication of non-coding for each entry of coding table 34. This may be made in decentralized manner in each table entry or in centralized manner by incrementing a counter of the coding number. This latter manner makes it possible in particular to achieve reinitialization processing at (practically) nil cost.

In practice, for the above two variants:
  at the end of the coding of these data, it is provided to reset all the "already coded" fields to 'false' in order to be able to properly perform a second coding operation;
  when a value is encountered in the extracted items, if Cv<Ct, literal coding is carried out of the value using a pre-coded value already present in the tables 34 (since that value has already been coded during a preceding coding operation of the file 10*a,b*). The index of the value is updated (since the index found in the table 34 corresponds to that of the previous coding operations of the documents 10*a,b*) and Cv is made equal to Ct (reinitialization by incrementation). If Cv>=Ct, the value has already been literally coded for the coding of the current document 10*c* and the index of the value is coded.

When the prediction of the module 25 is correct, efficient coding of the item by the coding module 32 is carried out. There can be distinguished here the case of a correctly predicted item of XML information, for example a tag, an attribute, and the case of an XML value, for example the values of attributes or of text nodes.

A detailed example of coding will be described below with reference to FIGS. 7 to 11, of which FIGS. 8, 9 and 10 in part illustrate the coding of an item of XML information whether correctly predicted or not.

In the case of an item correctly predicted, the state of that item is automatically known, in particular if it has already been coded or not during the current coding of the document 10 by virtue, for example, of the value of the non-coding indicator in the coding tables 34.

If the item has not yet been indexed for the coding of the current document 10*c* ("already-coded" field at 'false' or Cv<Ct, for both the above variants), coding is carried out of the string corresponding to the item (the element name, the prefix or the URI of the namespace declaration, the value of an attribute, etc.). This coding generally corresponds to the conventional translation of the string into UTF8 format. The result of the prediction generally contains the form that is translated and that can be directly transmitted to the coding module 32. According to a particularity of the invention, this translation will have been carried out in advance, for example on generation of the coding tables 34 on the basis of the description file 26' This translation is thus carried out only once for all the documents which are coded.

If the item has already been indexed, the index of the item is coded. It is noted here that in this case the index will possibly have been obtained directly from the description structures 26 at the prediction phase. The coding of the index may also be factorized:
  at the time of generating the tables 34 and the description structures 26: in this case, the item will always have the same index and the index conversion to bytes is carried out a single time for all the documents. Saving in terms of efficiency and speed is thus achieved on coding several documents;

for each current coding of the document 10*c*: in this case, the conversion is made a single time by coding if necessary, that is to say when the index of the item is not the same as at the previous coding of the documents 10*a,b*.

The coded item 35 then corresponds to the coded index and/or to the coded string.

The case of the coding of an XML value will be described in more detail with reference to FIG. 10 in part and to FIG. 11. The XML values are for example the values of attributes and of text nodes but also text values contained by different XML events (CDATA, comments, processing instructions, etc.).

It is noted that coding according to the prior art first of all requires determining which coding algorithm to use. Different algorithms may indeed be used to code these XML values more efficiently (in terms of rapidity and/or compression) depending on their type differentiation. These algorithms are generally determined by the application which uses the coder to send/store the XML document 10*c*. In the context of using a standard XML programming interface (SAX, PULL, DOM), these algorithms are to be found in a table which must be accessed to find the specific algorithm.

By default, two approaches for coding the XML values are possible:
either sorting is made between the values to index and the values not to index;
or indexing is carried out of all the values to index.

The first strategy has the advantage of making it possible to limit the size of the memory used by the coder since only the values to index will be processed. It also makes it possible only to index the values which are potentially redundant.

Where it is desired to index the value, a coder as defined by the state of the art verifies whether that value has been indexed during the current coding and updates the corresponding coding table if necessary.

Figure 10:
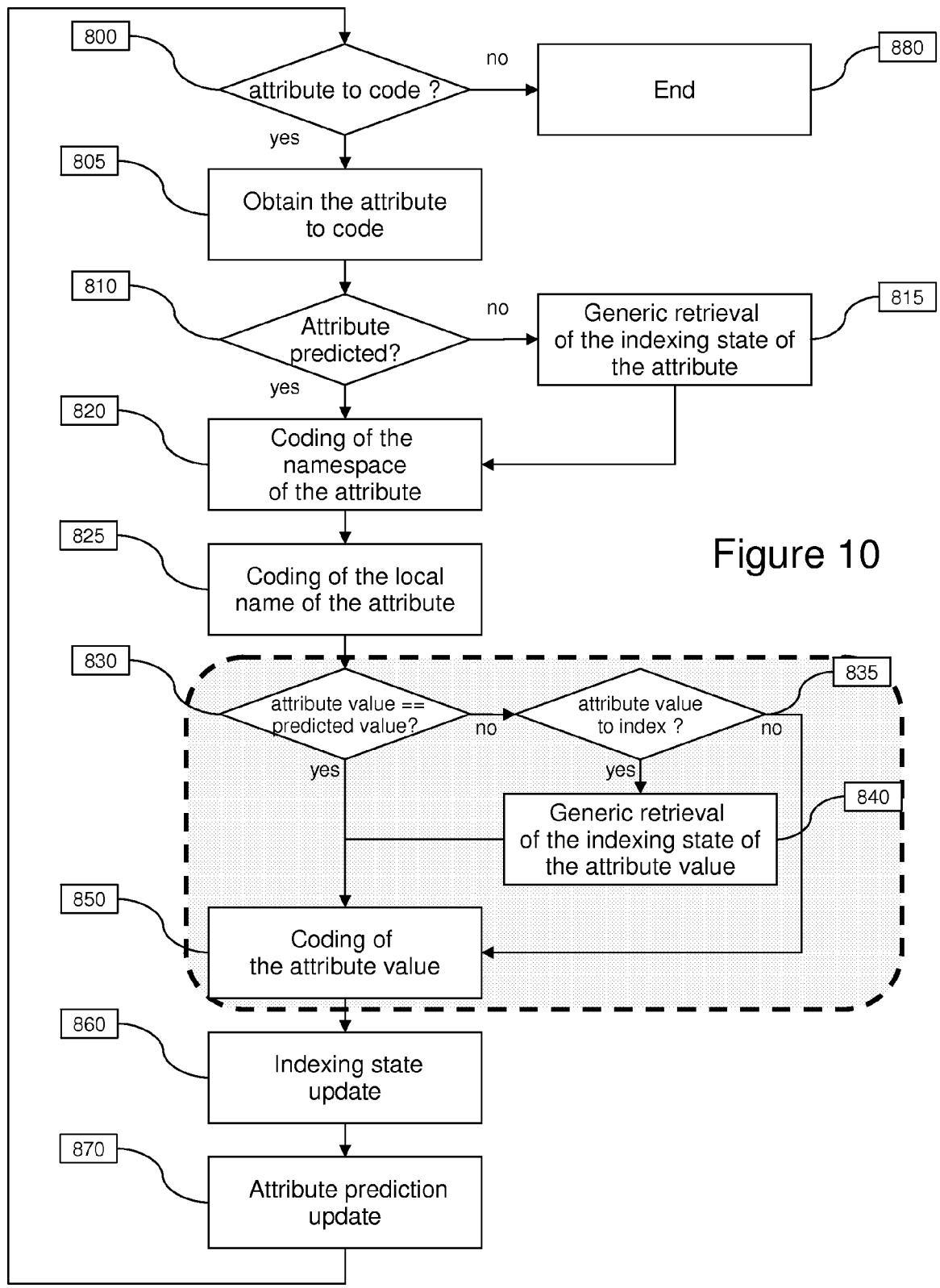
FIG. 10 illustrates, in logigram form, steps for the specific coding of the attributes in the process of FIG. 7.
Figure 11:
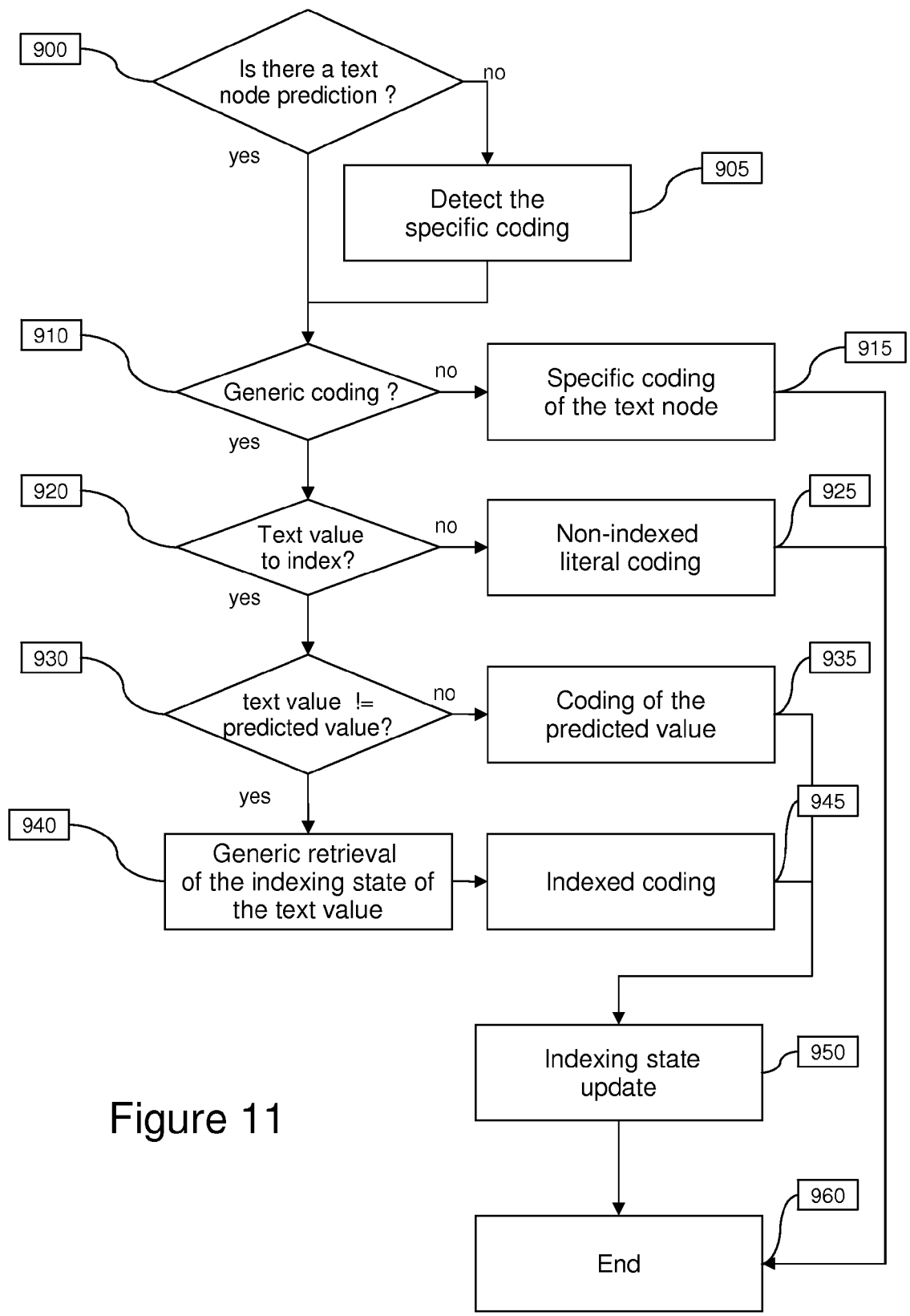
FIG. 11 illustrates, in logigram form, steps for the specific coding of a text node in the process of FIG. 7.

The invention as described in relation to FIGS. 10 and 11 on the contrary makes it possible to:
perform the search for the type of algorithm only once for all the coding operations instead of doing it for each value;
make a decision for indexing the values based on the previous coding operations. This decision takes as a parameter the name of the parent element/attribute of the value to code.

Where the prediction of the value is exact, which frequently occurs, for example, for whitespaces, the invention makes it possible in particular:
not to perform the indexing search in the coding tables 34 and structures 26;
only perform the string to byte conversion once for all the coding operations.

These different advantages offer a saving in terms of coding speed. It is also to be noted that this saving is not counterbalanced by additional processing operations necessary for the invention. In particular, the cost of retrieving this coding information corresponds to the cost of prediction or generic search necessary for the coding of the parent item of XML information.

Figure 2:
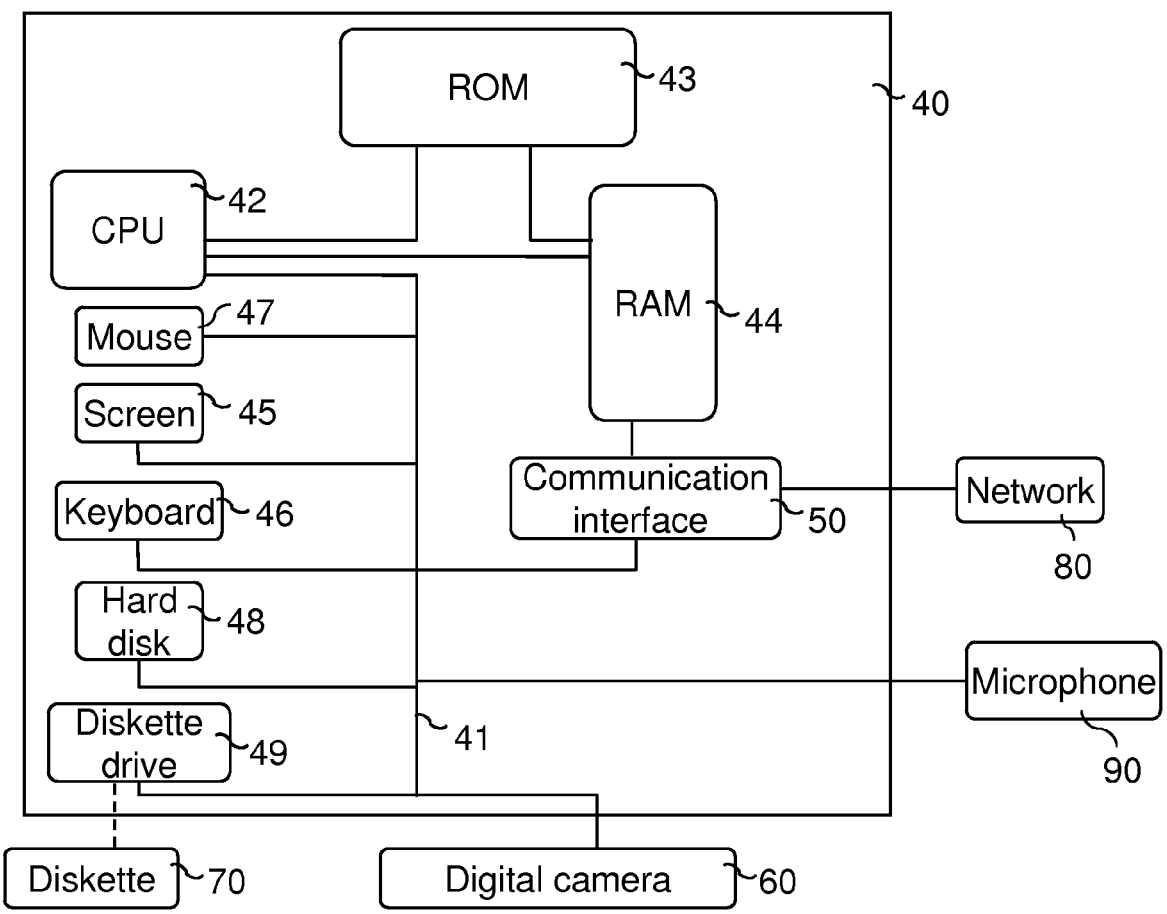
FIG. 2 shows a particular hardware configuration of an information processing device adapted for an implementation of the method according to the invention.

With reference to FIG. 2, a description is now given by way of example of a particular hardware configuration of an information processing device adapted for an implementation of the method according to the invention.

An information processing device implementing the present invention is for example a micro-computer 40, a workstation, a personal assistant, or a mobile telephone connected to different peripherals. According to still another embodiment of the invention, the information processing device takes the form of a camera provided with a communication interface to enable connection to a network.

The peripherals connected to the information processing device comprise for example a digital camera 60, or a scanner or any other means of image acquisition or storage, that is connected to an input/output card (not shown) and supplying multimedia data to the information processing device.

The device 40 comprises a communication bus 41 to which there are connected:
A central processing unit CPU 42 taking for example the form of a microprocessor;
A read only memory 43 in which may be contained the programs whose execution enables the implementation of the method according to the invention;
A random access memory 44, which, after powering up of the device 40, contains the executable code of the programs of the invention as well as registers adapted to record variables and parameters necessary for the implementation of the invention;
A screen 45 for displaying data and/or serving as a graphical interface with the user, who may thus interact with the programs according to the invention, using a keyboard 46 or any other means such as a pointing device, for example a mouse 47 or an optical stylus;
A hard disk 48 or a storage memory, such as a compact flash type card, able to contain the programs of the invention as well as data used or produced on implementation of the invention;
An optional diskette drive 49, or another reader for a removable data carrier, adapted to receive a diskette 70 and to read/write thereon data processed or to process in accordance with the invention; and
A communication interface 50 connected to the telecommunications network 80, the interface 50 being adapted to transmit and receive data.

In the case of audio data, the device 40 is preferably equipped with an input/output card (not shown) which is connected to a microphone 90.

The communication bus 41 permits communication and interoperability between the different elements included in the device 40 or connected to it. The representation of the bus 41 is non-limiting and, in particular, the central processing unit 42 unit may communicate instructions to any element of the device 40 directly or by means of another element of the device 40.

The diskettes 42 can be replaced by any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the information processing device to implement the invention may equally well be stored in read only memory 43, on the hard disk 48 or on a removable digital medium such as a diskette 70 as described earlier. According to a variant, the executable code of the programs is received by the intermediary of the telecommunications network 800, via the interface 50, to be stored in one of the storage means of the device 40 (such as the hard disk 48) before being executed.

The central processing unit 42 controls and directs the execution of the instructions or portions of software code of the program or programs of the invention, the instructions or portions of software code being stored in one of the aforementioned storage means. On powering up of the device 40, the program or programs which are stored in a non-volatile memory, for example the hard disk 48 or the read only memory 43, are transferred into the random-access memory 44, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 42, may implement all or part of the processing operations described in relation to FIGS. 1 and 3 to 11, to implement each method of the present invention and constitute each device of the present invention.

With reference to FIGS. 3 to 11, a description is now given in more detail of the generation of the description file 26' and consequently the description structures 26, for example in the absence of a file 26' (FIGS. 3 to 6) and of the coding of the items implementing a prediction in accordance with the invention (FIGS. 7 to 11).

To simplify the explanations, reference is made in what follows to the description file 26'. These explanations are also applicable to the description structures 26 for which it will then be appropriate to comply with the nomenclatures for the date objects used.

As indicated with reference to FIG. 1, the description file may be generated before or during the phase of actual coding. The description provided below shows these two steps of generation and coding independently. In reality the two steps may be carried out in parallel: the generation of the description may be progressive, in particular on the prediction of the following items and be used by the step of actual coding. For reasons of clarity, these steps are nevertheless separated in the remainder of the description.

The construction of the description file 26' on the basis of a set of documents 10 is carried out in two steps. In a first phase, a statistical analysis of the documents is carried out as described below in relation to FIGS. 3 to 5. Next, with this statistical information available, a step of generating the description 26 is carried out (FIG. 6).

It is to be noted that the statistical analysis performs numerous processing operations identical to those carried out during coding of an XML document. Due to this, the step of statistical analysis may be carried out in parallel to coding for a moderate cost increase.

The step of generating the description 26, 26' may, moreover, be carried out an any time, for example:
- incrementally during the coding of the first XML documents;
- at a time when the statistical data collected are considered to be sufficient, for example as soon as ten elements to code are possessed.

If the description 26, 26' is generated at the coding of the first documents 10$a,b$, these will be coded more slowly than with a generic coding. The initial cost increase is then more than compensated for by the savings provided by that description during the following coding operations in accordance with the method of the invention.

Figure 3:
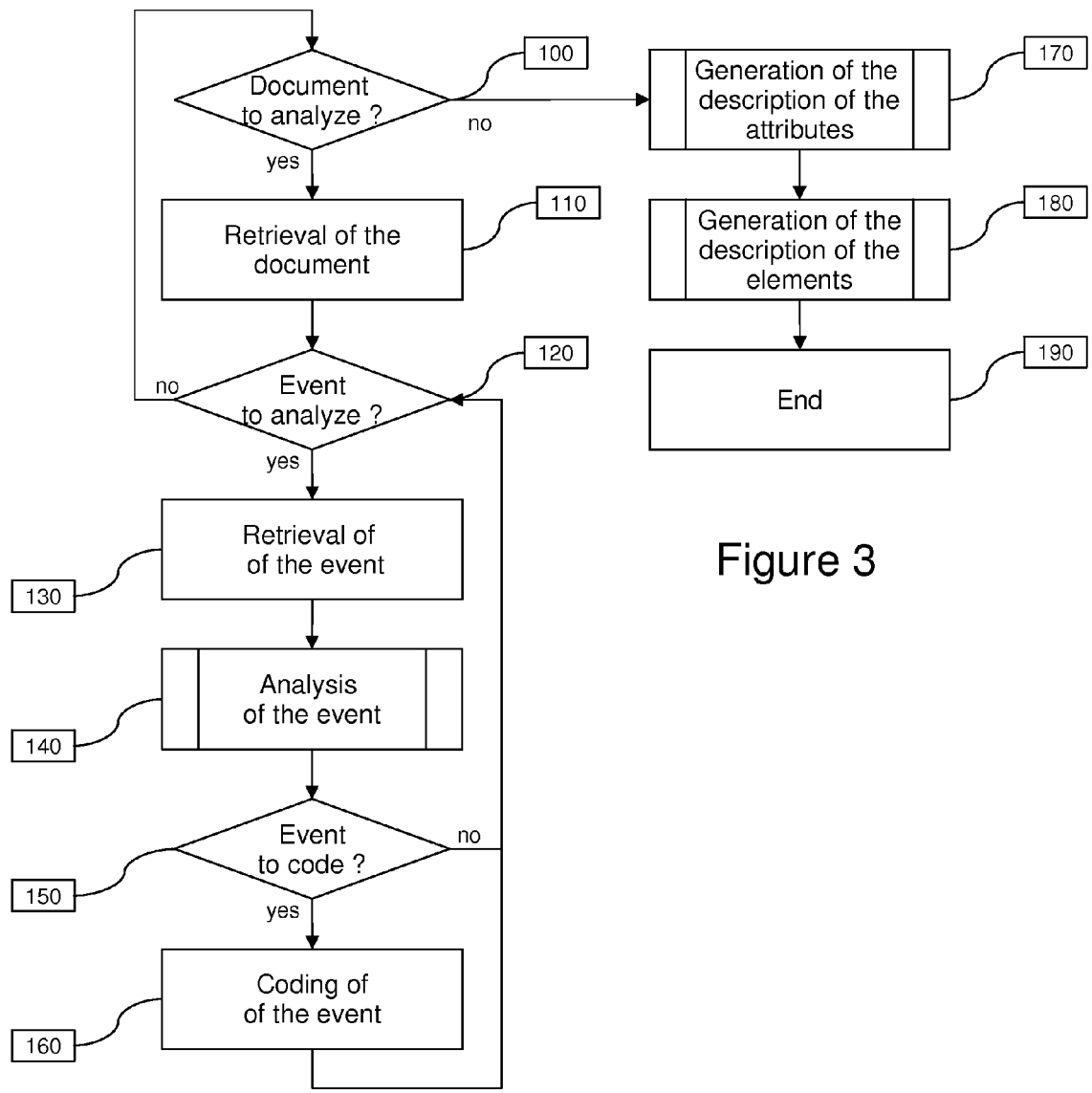
FIG. 3 is a representation, in the form of a logigram, of an example of construction of a file and/or of description structures.

With reference to FIG. 3, the general algorithm for analysis of the XML documents 10 has been represented.

Commencement is made with step 100 at which it is determined whether there is a document to analyze and possibly to code.

In the affirmative, the document is retrieved at step 110, event by event, via an extraction module, for example similar to the module 21 of FIG. 1.

So long as events remain (step 120), the event in question is retrieved at step 130.

At step 140, the event is analyzed in accordance with the mechanisms described below with reference to FIGS. 4 and 5.

At step 150, it is determined whether the event is to be coded.

In the affirmative (step 160), the coding is carried out on the basis of the information provided at the analysis step 140 for each of the items composing the event. The steps of indexing and search in the coding tables 34 (including the description structures 26) may be carried out in a single time at step 140 in order to perform coding at a reasonable cost.

Then the next event is proceeded to at step 120.

When the whole of the document has been analyzed (no more events to analyze at step 120) step 100 is returned to in order to determine whether another document 10 must be analyzed.

In the affirmative, the analysis is continued by steps 110 to 160 until all the documents have been used up.

When all the documents have been analyzed (response NO at step 100), the generation of the description 26, 26' is carried out and successively of the attributes at step 170 and then of the elements at step 180. A more detailed description is provided below with reference to FIG. 6.

It is, moreover, possible to generate a description 26 of other events, for example processing instructions, comments, CDATA. Equivalent mechanisms are then used.

The process of generating the description file 26' terminates at step 190 with the generation of the coding tables 34 and description structures 26 on the basis of the description file 26'. The coding tables are thus generated enabling a coder to very efficiently code similar documents to the documents analyzed. The closer the documents to code are to the documents analyzed, the more efficient is the coding.

Figure 4:
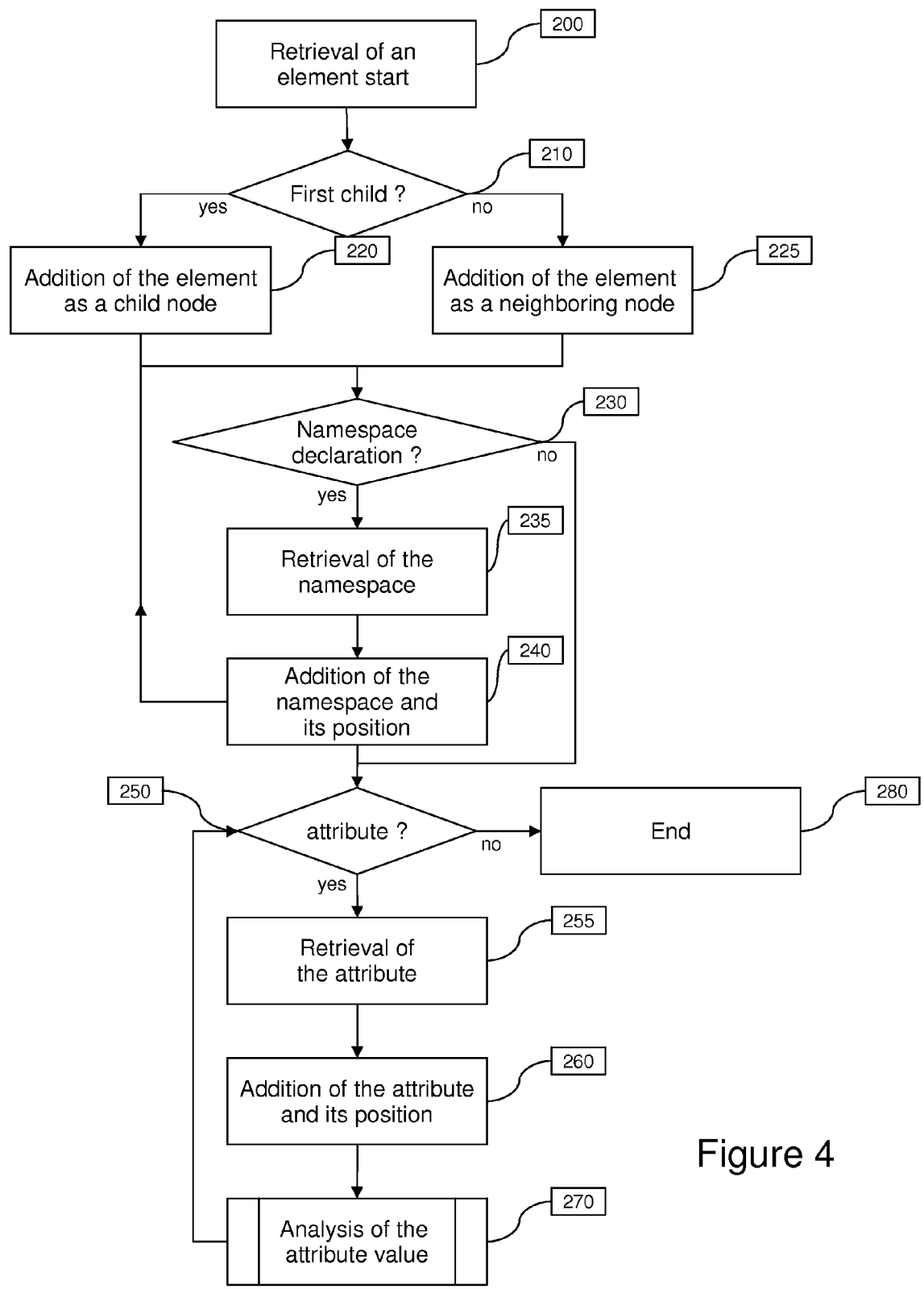
FIG. 4 represents, in logigram form, steps of analyzing items of information to code during the construction of the file and/or of the description structures of FIG. 3.
Figure 5:
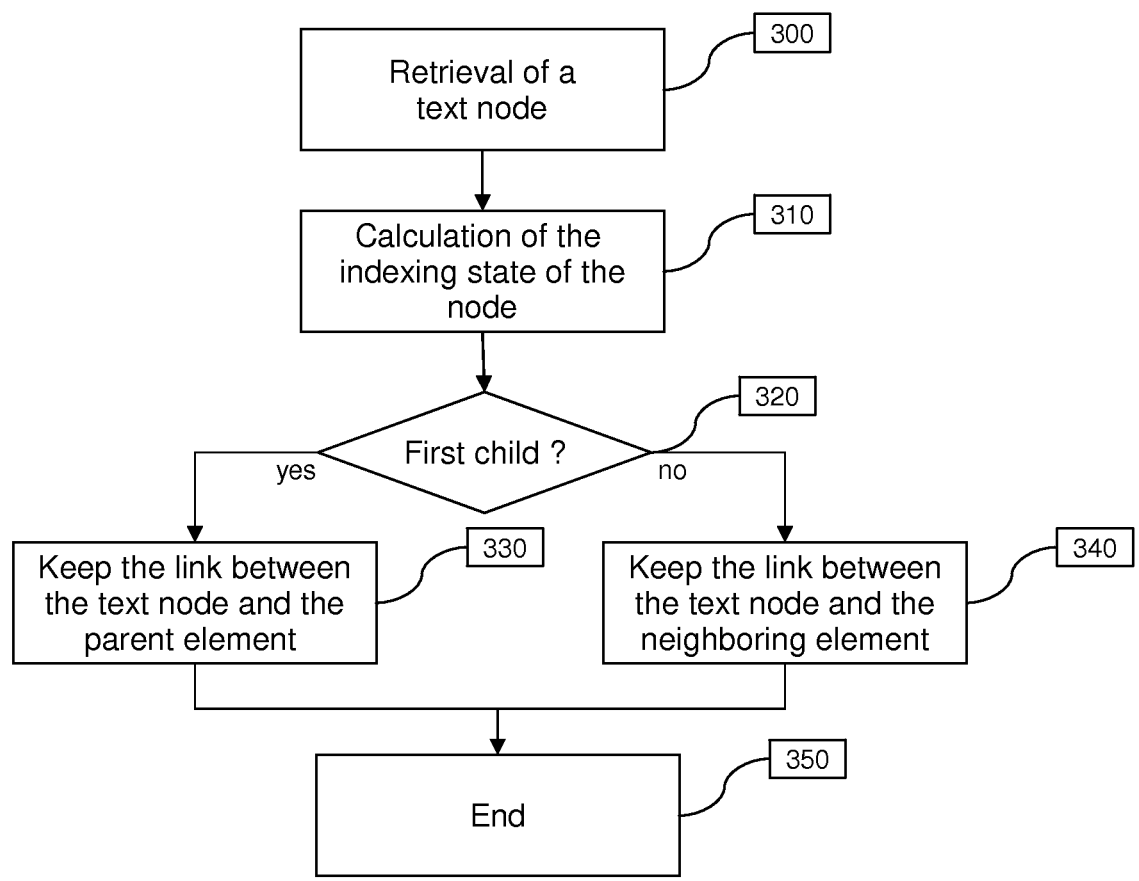
FIG. 5 represents, in logigram form, steps of analyzing XML values to code during the construction of the file and/or of the description structures of FIG. 3.

FIG. 4 illustrates the steps of analyzing an event of opening tag type and FIG. 5 those of analyzing a text node. The description provided below presents the mechanisms for analysis that it is possible to apply to other events, for example processing instructions, comments, CDATA.

It is to be noted that the processing of closing tag events only serves to update the current state 24 of the analyzer (on generation of the description file 26') and/or of the coder (on coding the document 10$c$).

With reference to FIG. 4, the analysis of the opening tag commences with a step 200 of retrieving the opening tag event (coming from step 130).

At step 210, it is determined whether this opening tag is a first child of the parent element, that is to say whether it is the first element hierarchically below which follows the parent element. For this, the previously analyzed element may be kept in memory to determine whether it is the parent element in which case the new opening tag is probably a first child.

In the affirmative, the element is added, at step 220, to the list of the first children of the parent element.

In the negative, the element is added, at step 225, to the list of direct neighbors of the previous element (in the document in course of analysis) of the same level. It is to be recalled here that an ordered list of these direct neighbors may be kept up to date.

Further to steps 220 and 225, it is determined whether that opening tag contains namespace declarations (step 230).

In the affirmative, those namespace declarations are retrieved at step 235. In practice, those namespace declarations are introduced at the start of XML document 10.

For each namespace declaration retrieved at step 235, the prefix, the URI and their association are kept. These elements serve later to pre-fill the coding tables and description structures linked to the namespaces and enable a good prediction of the URI knowing the prefix. The position of the namespace declaration for the "opening tag" is also kept. This information serves to correctly predict the future namespace declarations linked to that opening tag.

Thus, at step 240, these elements linked to the namespace and its position in memory are added to a description structure associated with the opening tag in course of analysis.

Steps 230 to 240 are reiterated for each of the namespace declarations of the opening tag.

Afterwards comes step 250 preparing the analysis of the attributes of the opening tag.

In case of negative response at step 230, the analysis of the attributes of the opening tag of step 250 is proceeded with directly.

At step 250, the presence or not of attributes in the opening tag examined is determined.

In the absence of an attribute, the analysis process is terminated (step 280).

When an attribute is detected, it is isolated and retrieved at step 255.

At step 260, the name of the attribute and its position for that opening tag are taken and are added to memory in the description structure of the opening tag in course of formation. It is to be noted here that the namespace declarations and the attributes are dealt with in similar manner.

Next, at step 270, an analysis of the value of the attribute is carried out. This analysis is virtually the same as the analysis of the text nodes which is presented below with reference to FIG. 6 in the case of direct child text nodes.

Steps 250 to 270 are reiterated for all the attributes of the opening tag, until the analysis process terminates at step 280.

With reference to FIG. 5, the analysis of a text node commences with the retrieval of a text node at step 300.

At step 310, the indexing state of the text node is determined. For example, a text node takes an active indexing state (that is to say that on coding, that text node will have to be associated with an index, that index being used for the other iterations of the same text node during the coding) when it is determined that there are several iterations of that same text node in the XML document 10. This step makes it possible to determine at the time of generating the description whether the text nodes of any particular element or attribute are to be indexed or not. In practice, one bit of the literal values may be used to specify whether indexing must be provided.

By acting on the indexing, it is thus possible to limit the memory space of a coding table 34. An indexing criterion may for example be the length of the value/text, based on the principle that the longest values/texts are generally not repeated.

Next, at step 320, it is determined whether the text node is the first child of the parent element.

In the affirmative, in the description structure of the opening tag in course of formation, at step 330, the link is kept between the text node and the parent element, for example in an ordered list associated with said parent element and listing all of its children.

In the negative, at step 340, the link is kept between the text node and the neighboring element, for example in an ordered list associated with said neighboring element and listing all of its neighbors.

The distinction between "child" and "neighbor" is made since, in particular for space text nodes, it enables a more efficient prediction of the text nodes on the basis of the previous event.

The process of analysis of the text node is terminated at step 350.

With reference to FIG. 6, a description is now given of the generation of the description structures 26 (and equally for the description file 26') on the basis of the information coming from the previous analyses (FIGS. 3 to 5) and stored, for example, in memory of an analyzer.

At step 400, the process is started by the generation of the namespace information.

This first step consists of generating the coding tables corresponding to the prefixes and URIs used. The prefix-URI associations are in particular stored. These associations are used for the definitions of element and attribute names.

These associations moreover make it possible to code the namespace declarations faster: a conventional coder performs a search in a table for a prefix and a search in a table for the URI to determine their indexing states. By keeping the association according to the invention, the coder is generally enabled to perform only one search in a table: once the search for the prefix has been made, the indexing state of the prefix and its most probable association are retrieved, which generally makes it possible to not to have to perform the search for the URI.

At this step, the literal values of the prefixes and URIs are pre-coded in the form of a series of bytes. This series of bytes may then be used directly by the coder on literal coding of the prefixes and URIs. This coding is thus avoided for each of the XML documents 10 to code.

The generation process is continued at step 410 by determining whether there are attributes detected during the analysis which have not yet been generated in the description structures 26.

In the affirmative, said attribute is retrieved at step 411.

At step 415, the coding information is generated for the name (namespace and local name) of the attribute in a specific structure which is referenced by the different description structures of elements which are linked to it.

At the following step 420, it is determined whether a specific algorithm must be applied to the value of the attribute.

If that is the case (output NO at step 420), this information is kept with the coding information of the name of the attribute (step 425) in the associated description structure. This information is thus immediately accessible on coding which avoids a supplementary search and reduces the processing time. A following attribute is then proceeded to (step 410).

If this is not the case (output YES at step 420), it is tested, at step 430, whether one of the values of the attribute has been re-used in the same document. For example, when the construction of the description file 26' is carried out if a sufficient amount of information is collected, the re-use of the attribute values in that collected information may be detected.

In the negative (output NO at step 430) this information is kept at step 435, with the coding information of the attribute name. It will in particular be possible for this information to be interpreted by the coder as a wish not to index that value, since no redundancy saving can be obtained. Continuation is made at step 440.

In the affirmative (output YES at step 430), this indexing information is kept (option by default) and it is tested, at step 440, whether some values appear frequently for that attribute.

This test typically aims to detect the case of attributes frequently having a particular value. In case of a sufficiently frequent value, the savings made by a correct prediction will exceed the losses given by an incorrect prediction.

It is to be noted that this frequency is calculated on the basis of the set of documents analyzed. Thus, an attribute appearing only once in a document may have a fixed value attributed to it.

In case of frequent values (output YES at step 440) there is thus kept, at step 445, all the frequent values (typically 1 or 2) with the coding information of the name of the attribute of step 415. The following attribute is then proceeded to (step 410).

In the absence of frequent values, the following attribute is proceeded to directly (step 410).

Steps 410 to 445 are re-iterated for all the attributes detected during the analysis.

When all the attributes have been described (output NO at step 410), the generation of the elements is proceeded to by first of all determining, at step 450, whether an element remains that was encountered during the analysis of the different elements which has not been described.

In the negative, the process of generating description structures is terminated at step 490.

In the affirmative, said element is retrieved at step 455.

Operation is continued at step 460 by the generation of the information relative to the name of the element, in particular its namespace and its local name as in the case of the attribute. It is a matter in particular of preparing the UTF8/UTF16 coding of these names, and possibly the coding of their associated indices if it can be detected that their indices do not change from one coding operation to another. Furthermore, these different values are referenced in the different coding tables 34. It is in particular possible to link the prefix (if there is one) to its URI to enable retrieval of the URI rapidly on the basis of the prefix.

Continuation is made at step 465 by the generation of the coding information necessary for the direct child and direct neighbor text nodes. It is in particular a matter of determining whether these nodes are to be indexed, if the value of these nodes is fixed (which is often the case when the nodes only contain spaces) or is an enumeration of a restricted set of values. If fixed or restricted values are detected, they are added to the indexing dictionary for text values and the UTF8/UTF16 coding of these values is prepared.

At step 470, detection is then made of the possible neighbor and child elements that are stored in the description file structure 26' in the form of pointers linking the different structures involved. It is possible to keep the all the possibilities for children and neighbors, or the most frequent possibility from among the children or from among the neighbors. This information is then used to perform the prediction of the following element to code by the prediction module 32. This information is stored for each element and is retrievable on the basis of the description structures 26.

At step 475, it is next detected whether the namespace declarations are predictable or not. More particularly, it is extremely frequent for these declarations to appear for the same element, generally in the same order. These declarations are linked to the declarations of the prefixes and URIs of the elements and attributes. For each element an ordered list of the namespace declarations is thus kept, which enables a very efficient serialization of these declarations.

At step 480, the same operation is carried out for the attributes by keeping an ordered list of the attributes, which makes it possible to predict the attributes of an element and their coding order. It is furthermore possible to keep a repeating set of values or a value for each attribute of the element. Similarly, indexing information of the value of the attribute is kept.

Steps 450 to 480 are reiterated for all the elements encountered during the analysis, and then the generating process is made to terminate at step 490.

A description is now given, with reference to FIGS. 7 to 11, of the coding of the XML documents 10 according to the invention with in particular the use of the description structures 26 and of the coding tables 34 for the prediction of items.

Figure 7A:
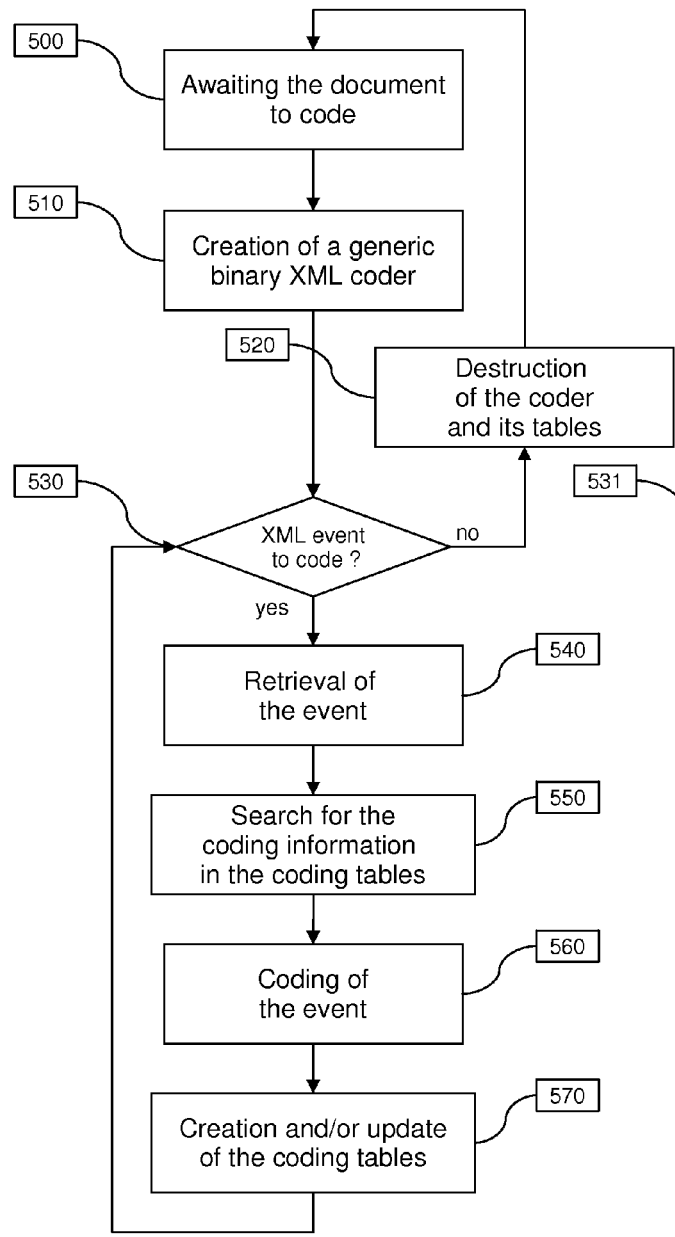
FIGS. 7a and 7b represent, in the form of logigrams, examples of coding respectively without and with initial description structures.

FIG. 7a describes in particular a binary XML coding operation without initial description 26. It is understood that the description structures 26 and the coding tables 34 may be created progressively with the advancement of the coding of XML documents 10 and serve as initial description structures for the later coding operations. It is thus envisaged to use this schema solely for the first XML document 10 to code.

Figure 7B:
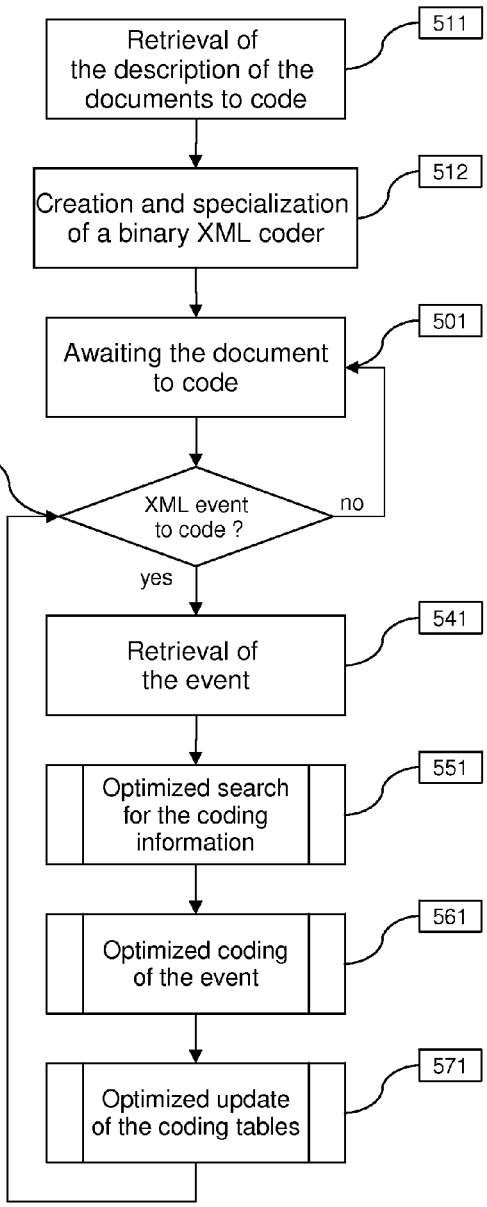

FIG. 7b describes a binary XML coding with initial description 26.

The coding process commences with the creation of a coder.

In the presence of a description file 26' (FIG. 7b), the latter is retrieved at step 511 and then the coder 20 is pre-configured in advance, at step 512, on the basis of the file 26'. As indicated earlier, this initial configuration comprises in particular the generation of the description structures 26 and of the coding tables 34.

In the absence of a description (FIG. 7a), the retrieval of a first document to code is awaited (step 500) and then the coder 20 is created according to a generic configuration, for example with coding tables 34 comprising a grammar by default.

When an XML document 10 is to be coded (steps 500 and 501), determination is made, at steps 530 and 531, of whether that document still contains an XML event to code. In practice, the extraction module 21 extracts the items and events in the order of the XML document 10. Thus, events to code are detected up until the end of the document.

In the absence of an XML event to code (output NO):
  the configuration of the coder 20 and the associated coding tables 34 are destroyed (step 520) where the prior description 26 is not supplied. Next, step 500 is returned to.
  a new document to code is awaited (step 501) where a prior description 26 is supplied. More particularly, in this case, the coder is not reinitialized for each document 10 to code but the same configuration is kept comprising the description structures 26 and the pre-filled coding tables 34.

When an XML event to code has been determined, its retrieval is carried out via the extraction module 21, at steps 540 and 541.

Next, at steps 550 and 551, a search is performed for the coding information in the coding tables 34 using the description structures 26 and possibly in addition the description file 26'.

When the coding tables 34 and the description structures 26 are pre-filled, this search is strongly guided and is generally faster that in the contrary case, especially in the case of efficient prediction.

It is noted that for the first event of the document to code, no current element is possessed on the basis of which a prediction can be made. Provision is then made that, either a description structure 26 is considered as initial (for example for the first <html> tag of an HTML document), or a generic coding operation is carried out of the first element extracted, which provides the way into the description structures 26 as described earlier.

The predicted item 27 is thus determined on the basis of the current state 24.

In particular, at the time of the prediction 25, retrieval is also made of the coding information directly from the coding tables 34 on the basis of the predicted element, consequently limiting the searches in the coding tables 34.

In step 550 (no a priori description), the search is carried out conventionally.

The event is then coded at steps 560 and 561.

When the description structure 26 of the event is present and retrieved from within the coding tables 34 by virtue of an exact prediction, the coding is faster since certain parts of the event may have been pre-coded in the description file.

In step 560 (absence of description 26), the coding is carried out conventionally.

The coding tables are next updated at steps 570 and 571 and possibly the description structures 26, when these are updated progressively with the advancement of the current coding.

Where the coding tables 34 have been pre-filled and an efficient prediction may be produced therefrom, it is rare to need to add a new entry in the coding tables, which limits the updating of the coding tables.

The following event is then proceeded to (steps 530 and 531).

The steps of searching 551, coding 561 and updating 571, in the presence of a description 26 and of pre-filled tables 34 are described in more detail below with reference to FIGS. 8 to 11 for, successively, the cases of an opening tag, a namespace declaration, an attribute and a text node.

The presence and the use of description structures 26 and of pre-filled tables 34 in each of these steps enables a high processing time saving compared with the conventional techniques.

Figure 8:
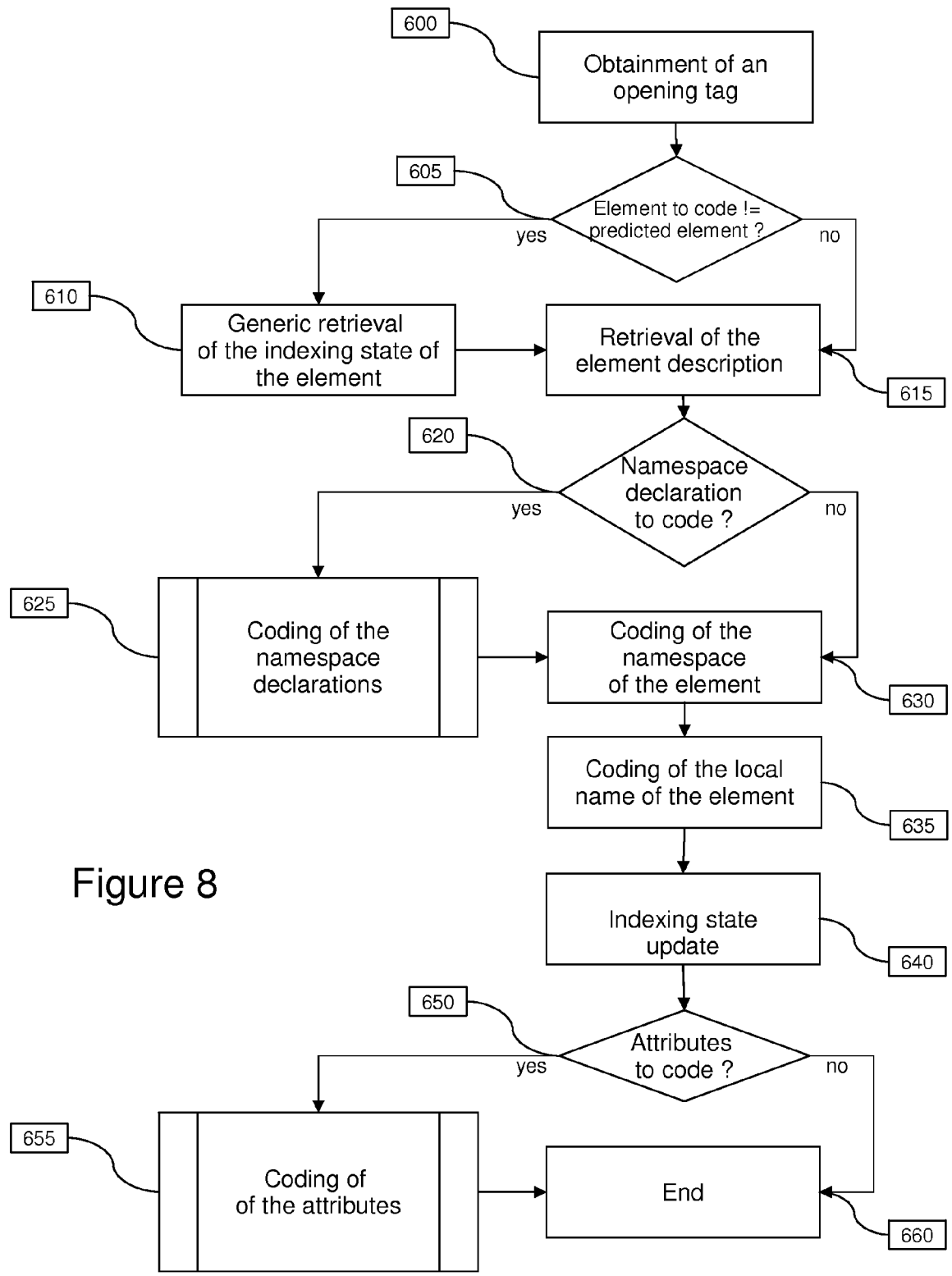
FIG. 8 illustrates, in logigram form, steps for the specific coding of an opening tag in the process of FIG. 7.

With reference to FIG. 8, the coding of an opening tag is illustrated in the case in which the tables 34 are pre-filled so as to possess description structures 26 of the opening tag element to code. A prediction of that tag is then obtained.

At step 600, the opening tag to code is retrieved (extracted tag 23).

At step 605, it is tested whether the prediction 27 of the item corresponds to the opening tag to code. This step is in particular carried out within the comparator 31.

In the negative (output YES at step 605), a generic (or conventional) search is carried out for the item in the coding tables 34 at step 610. Thus, at step 615, the description of the item is retrieved if it has already been indexed, that is to say if a description of that item is already in the tables (and thus in particular the pointer to the corresponding description structure).

In the affirmative (output NO at step 605), the exact prediction makes it possible to have, directly, the description structure relative to the tag to code and possible coding information, for example an index, supplied for example as of the prediction 25.

The following steps illustrate the coding of the information present in the opening tag (namespace declarations, names of elements, attributes). FIG. 8 presents a typical order for the coding of this information, but a different order is entirely possible in the context of the present invention.

Where the item does not have pre-filled description structures in the tables 34, the conventional coding methods of the prior art are returned to.

At step 620, it is determined whether the opening tag contains namespace declarations to code, that is to say new declarations not yet coded at the time of the current coding of the XML document 10c.

In the affirmative, the coding of these declarations is carried out, at step 625, on the basis of the description retrieved (either by prediction, or from the coding tables) for the item. An example of this coding operation is described below with reference to FIG. 9.

In the absence of declarations to code and further to step 625, coding is performed of the namespace of the item to code. These steps are reproduced for all the naming declarations in the tag. The retrieved description of the item makes it possible to know whether the item has been coded already (the information may be contained in the coding tables 34 as stated earlier), in which case the corresponding index given by the retrieved description is coded.

If the item has not yet been coded, its namespace is then coded at step 630 (the indexing information for that namespace is given by the retrieved description), and the same is done with the name of the item at step 635 (literal coding).

Continuation is made at step 640, by performing a step of updating the indexing in the coding tables 34.

The prediction 25 is also made of the next event to code, via for example the child element predicted in the description structure of the element in course of coding.

This prediction is also carried out at a closing tag, where the following element is predicted via that same description structure.

In the particular case of Fast Infoset, all the descriptions may be kept in the indexing table of the element names and the indexing table of the attribute names ('surrogates'), in order to thus have a general means for retrieving the description. The description then contains the information making it possible to code the element and to perform the future predictions.

In the case of Efficient XML, the grammar corresponding to each element may contain that description. It is thus possible to have two types of grammar, one based on hash tables for retrieving an index on the basis of an item name, the other based on an ordered list which is gone through at the time of the coding of the item.

The choice of the representation of the internal grammar depends upon the regularity of the item in the coded documents: if it is very regular, the second internal representation will be preferred. If the item has a high variability, the first internal representation will be preferred for it.

The coding is continued by that of the attributes of the opening tag.

At step 650, it is determined whether the opening tag contains non-coded attributes. In practice, the different attributes are gone through in the order of enumeration within the opening tag.

In the affirmative, their coding is carried out using the predicted description structure, at step 655. This coding will be described in more detail with reference to FIG. 10.

In the negative, and after the coding of step 655, the coding of the opening tag is then terminated. The coding process is made to terminate at step 660.

It is noted here, that if the description structures 26 and the pre-filled coding tables 34 correctly predict the item, no generic search or a limited number of searches is carried out in the coding tables 34.

Moreover, as the data to code may possibly already be in a pre-coded form (for example pre-coded indices, pre-coded strings) time is saved at the coding steps compared with the conventional coding of the prior art.

Figure 9:
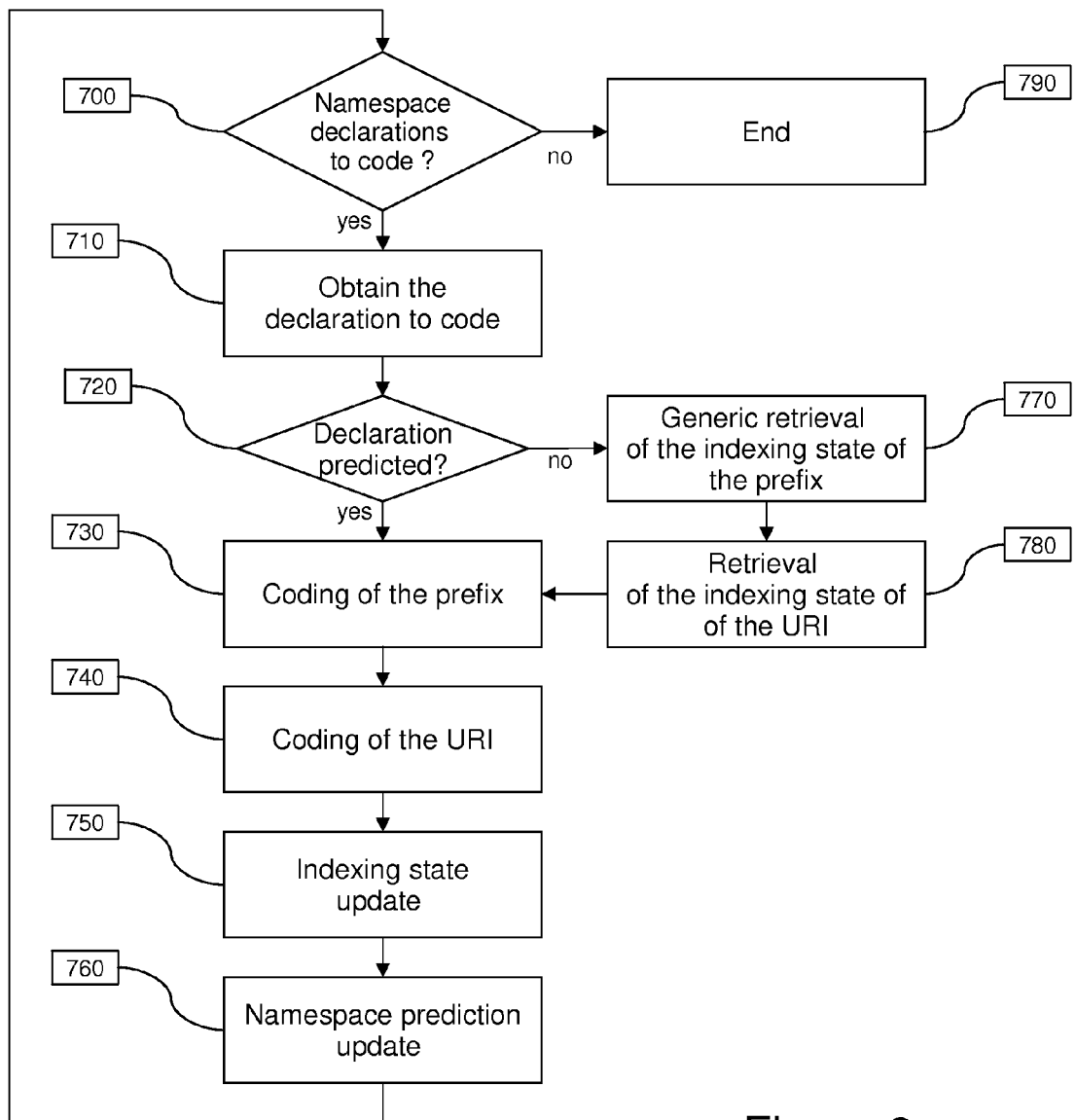
FIG. 9 illustrates, in logigram form, steps for the specific coding of the namespace declarations in the process of FIG. 7.

A description is now given, with reference to FIG. 9, of the coding of the namespace declarations in particular of step 625.

As the namespace declarations were detected at step 620, the following coding steps 710 to 780 are iterated (step 700) for each of the declarations.

At the end of processing (no more declarations to code), the process of FIG. 9 ends (step 790) to possibly return to step 630.

Thus, at step 710, each of the declarations to code of the opening tag are successively retrieved.

It is determined, at step 720, whether the declaration to code corresponds to the predicted declaration on the basis of the description structure of the element in course of coding.

In the affirmative, the information (for example pre-coded indices, pre-coded strings) of that declaration are retrieved to successively and efficiently code the prefix at step 730 and the URI at step 740.

Next, at step 750, updating is performed of the indexing state of the items of the namespace declaration in the coding tables 34, and, at step 760, by updating the prediction for the following namespace declaration. The prediction is thus obtained which will be used on the coding of following namespace declarations.

In the negative (if the namespace declaration is not correctly predicted), a generic search of the indexing state of the prefix is carried out, at step 770, in the coding tables 34.

If the prefix is not found in the coding tables 34, a generic search for the declaration is carried out in the indexing tables on the basis of the URI, at step 780.

If the prefix yielded is a prefix "by default", step 780 is passed on to directly. If it is a specific indexed prefix, the associated description structure is retrieved, which gives the URI generally associated with that prefix (predicted URI) and this is compared with the URI to code (extracted URI).

If the comparison fails, a generic search for the declaration in the indexing (coding) tables 34 on the basis of the URI is carried out at step 780.

In the least favorable case, the same searches as in the prior art are thus carried out without cost increase. In the most favorable cases, the invention improves the processing speed by reducing the number of searches carried out.

Once the prefix has been retrieved by any one of the routes mentioned above (steps 770 and 780), the coding of the prefix 730 is carried out and the process is continued as described above for steps 740 to 760.

Once the namespace prediction has been updated (step 760), the following declaration is proceeded to (step 700).

A description is now given, with reference to FIG. 10, of the coding of the attributes, in particular those of the opening tag at step 655.

The coding of the attributes follows a similar scheme to that of the coding of the namespace declarations of FIG. 9.

As attributes were detected at step 650, the following coding steps 805 to 870 are iterated (step 800) for each of the declarations.

At the end of processing (no more attributes to code), the process of FIG. 10 will end (step 880) to return for example to step 660.

Thus, at step 805, each of the attributes to code is successively retrieved.

At step 810, it is determined whether the attribute to code corresponds to the attribute predicted from the description structure 26 determined on the basis of the previously coded item.

In the negative, a generic search is carried out in the coding tables 34 at step 815 and the indexing information of the attribute is retrieved.

In the affirmative and further to the search of step 815, the indexing information of the attribute are thus possessed either by prediction or by the search of step 815. The namespace of the attribute is then coded at step 820 and the name of the attribute at step 825, in the same way as it is carried out for an opening tag (see FIG. 6).

Continuation is made by coding the value of the attribute in similar manner to the coding of the text nodes of which an example is given below in relation to FIG. 11. The coding of the value of the attribute is represented in simplified manner in FIG. 10 by the box in dashed line.

At step 830, where a prediction of the attribute has been provided, it is determined whether that prediction comprises the value of the attribute to code.

In the negative or in case of absence of the prediction of the attribute, it is tested, at step 835, whether the attribute value is to be indexed, for example by taking into account the size of the attribute.

If that is the case, at step 840, the indexing state of the value is retrieved in conventional manner from the coding tables 34, and then the value is coded on the basis of that information at step 850.

If the value is not to be indexed, the coding of step 850 is proceeded to directly. The coding in this case is carried out literally, without any prior generic search in the coding tables 34.

Where the prediction of the attribute value is exact (output YES from step 830), the prediction is used to efficiently code that value, for example, from the pre-filled tables 34 and on the basis of that prediction, a pre-coded value or an index is retrieved.

Continuation is made at step 860 by updating the indexing state of the items of the attribute and at step 870 by updating the prediction for the following attribute. The prediction which will be used on coding the following attribute is thus possessed.

Once the following attribute prediction has been carried out, the following attribute is proceeded to (step 800), until all the attributes have been used up.

Lastly, with reference to FIG. 11, a description is given of the coding of the text nodes. This coding may also apply, with minor adaptations to the specificities of the attributes, to the coding of the attribute values as represented by the box in dashed line of FIG. 10.

It is noted that the possibility of fixed values is in particular very important where the typographical spaces between items are kept. It is to be noted that the description of the item defines two predictions for text nodes: the first child text node and the neighboring text node.

When a text node is retrieved for coding, it is determined in a first step 900 whether a prediction of the text node has been carried out.

In the negative (output NO), a coding type to be performed is searched for, at step 905, possibly taking into account the type differentiation of the attribute values (string, float, int, etc.).

In the affirmative or further to step 905, it is determined whether a coding of specific type is to be used or not (step 910). This coding of specific type is deduced from the result of step 905 or from the presence of coding information of specific type in the predicted description structure.

If that is the case (output NO at step 910), this coding is used (step 915) to code the text node. The algorithm then ends at step 960.

If that is not the case (output YES at step 910), it is tested whether the value is to be indexed or not (step 920). This indication is present in the predicted description structure, for example. By default, a test may be used on the length of the string to determine the appropriateness of indexing the text or not.

Where this value is not to be indexed (output NO at step 920), non-indexed coding of the text, for example literal coding, is carried out at step 925. It is to be noted that in this case a generic search in the coding tables 34 is avoided, which enables faster coding, to the detriment of potentially better compression. It is consequently useful for the prediction to be sufficiently precise. The non-indexed coding 925 is followed by the end of the process of coding the text node 960.

Where this value is to be indexed (output YES at step 920) in particular because the predicted description structure includes a value for that text node, it is tested whether the predicted value for that node is correct (for example the strings identical to the text node to code) at step 930.

In the affirmative (output NO at step 930), this value is coded on the basis of the coding information from the predicted description structure, at step 935.

In the negative (output YES at step 930) a search and generic retrieval of the indexing state of the text value to code is carried out at step 940 from the coding tables 34. An indexed coding of the value retrieved is then carried out at step 945.

On leaving steps 935 and 945, the indexing state relative to the text value is updated, in the coding tables 34 and possibly in the description structures 26 (step 950).

The algorithm for coding the text node then ends at step 960.

The invention thus makes it possible to accelerate the coding of hierarchized data by relying, in a general manner, on a pre-generated coding table comprising at least one description structure, and in a specific manner, on other complementary mechanisms, such as item prediction and pre-coding of values.

The decoding of a coded document produced according to the invention is conducted conventionally since the coded document is sufficient by itself. For example, the routine for decoding a value may be carried out as follows:

is the value indexed?

yes, retrieve the index (integer) then retrieve the value on the basis of the index and the table associated with the type (prefix, URI, local name) of the value;

no, retrieve the string from the binary XML stream (UTF-8 or UTF-16 decoding) and add that retrieved string to the table associated with the type of the value.

The preceding examples are only embodiments of the invention which is not limited thereto.

The invention claimed is:

1. A method of processing a document of hierarchized data organized into a plurality of items, the method comprising:

obtaining a plurality of description structures respectively associated with a plurality of items, each description structure being linked to another description structure through a prediction link that reflects the structure and organization of previously encoded other documents of hierarchized data generated by a same application that generated the document of hierarchized data;

storing each description structure, each prediction link, and at least one encoding link in a memory of an encoder;

obtaining, from the memory of the encoder, the at least one encoding link that links a description structure associated with an item to an encoding value of at least one encoding table, the at least one encoding table being generated based on prior coding according to the structure and organization of the other documents of hierarchized data generated by the same application that generated the document of hierarchized data;

encoding a first item of the document;

predicting a second item of the document to code, the predicting including:

(i) searching for a description structure associated with the first item among the plurality of description structures;

(ii) determining a predicted description structure based on the prediction link of the description structure associated with the first item; and (iii) generating a predicted item based on the item associated with the predicted description structure;

extracting the second item of the document to code;

determining whether the predicted item matches the extracted second item; and when the predicted item matches the extracted second item, coding the second item using the encoding value corresponding to the encoding link associated with the predicted description structure.

2. The method according to claim 1, wherein the plurality of description structures is generated based on the prior coding of the other documents of hierarchized data generated by the same application as the document.

3. A device having a central processing unit for processing a document of hierarchized data organized into a plurality of items, the device comprising:

an obtaining unit that obtains a plurality of description structures respectively associated with a plurality of items, each description structure being linked to another description structure through a prediction link that reflects the structure and organization of previously encoded other documents of hierarchized data generated by a same application that generated the document of hierarchized data;

an encoder including a memory that stores each description structure, each prediction link, and at least one encoding link, wherein the obtaining unit further obtains, from the memory of the encoder, the at least one encoding link which that links a description structure associated with an item to an encoding value of at least one encoding table, the at least one encoding table being generated based on prior coding according to the structure and organization of the other documents of hierarchized data generated by the same application that generated the document of hierarchized data, and wherein the encoder encodes a first item of the document;

a prediction unit that predicts a second item of the document to code, the prediction unit including:

(i) a searching unit that searches for a description structure associated with the first item among the plurality of description structures;

(ii) a determination unit that determines a predicted description structure based on the prediction link of the description structure associated with the first item; and (iii) a generating unit that generates a predicted item based on the item associated with the predicted description structure;

an extraction unit that extracts the second item of the document to code, wherein the determination unit further determines whether the predicted item matches the extracted second item; and when the predicted item matches the extracted second item, a coding unit codes the second item using the encoding value corresponding to the encoding link associated with the predicted description structure.

4. The device according to claim 3, wherein the generating unit includes generating a literal pre-coding of at least one value associated with at least one item, and storing the literal pre-coding of the at least one value in the coding structure associated with the at least one item.

5. The device according to claim 3, wherein the at least one encoding table includes an indicator in each of the coding structures associated with an item, the indicator being arranged to indicate whether the item has already been coded.

6. The device according to claim 5, wherein the indicator includes a flag, the flag taking a first value at a start of the coding and taking a second value at a time of the coding of the corresponding item.

7. The device according to claim 5, wherein a first counter is incremented at each coding of a particular item of the document and a second counter is incremented at each coding of any item of the document, wherein the indicator indicating whether the item has already been coded results from a comparison of the first counter and the second counter.

* * * * *